(12) United States Patent
Hayashi et al.

(10) Patent No.: US 11,390,822 B2
(45) Date of Patent: *Jul. 19, 2022

(54) BIOMASS SOLID FUEL

(71) Applicant: UBE INDUSTRIES, LTD., Ube (JP)

(72) Inventors: Shigeya Hayashi, Ube (JP); Hiroshi Amano, Ube (JP); Nobuyuki Ooi, Ube (JP); Yuusuke Hiraiwa, Ube (JP)

(73) Assignee: UBE INDUSTRIES, LTD., Ube (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/514,776

(22) PCT Filed: Oct. 7, 2015

(86) PCT No.: PCT/JP2015/078552
§ 371 (c)(1),
(2) Date: Mar. 27, 2017

(87) PCT Pub. No.: WO2016/056608
PCT Pub. Date: Apr. 14, 2016

(65) Prior Publication Data
US 2017/0218290 A1    Aug. 3, 2017

(30) Foreign Application Priority Data

Oct. 7, 2014  (JP) .............................. JP2014-206118

(51) Int. Cl.
*C10L 5/36*  (2006.01)
*C10L 5/44*  (2006.01)
(Continued)

(52) U.S. Cl.
CPC ................ *C10L 5/442* (2013.01); *C10L 5/08* (2013.01); *C10L 5/28* (2013.01); *C10L 5/36* (2013.01);
(Continued)

(58) Field of Classification Search
CPC .. C10L 2200/0469; C10L 5/361; Y02E 50/10; Y02E 50/30
See application file for complete search history.

(56) References Cited

U.S. PATENT DOCUMENTS

| 7,932,065 B2 * | 4/2011 | Medoff | .................... C08H 8/00 |
| | | | 435/165 |
| 7,942,942 B2 * | 5/2011 | Paoluccio | ................. C10L 5/44 |
| | | | 44/589 |

(Continued)

FOREIGN PATENT DOCUMENTS

| CA | 2885804 A1 | 4/2014 | |
| CA | 2896771 A1 * | 6/2014 | ................ C10L 5/44 |

(Continued)

OTHER PUBLICATIONS

Machine Translation of CA2896771 (Year: 2014).*
(Continued)

*Primary Examiner* — Ellen M Mcavoy
*Assistant Examiner* — Ming Cheung Po
(74) *Attorney, Agent, or Firm* — Law Office of Katsuhiro Arai

(57) ABSTRACT

A biomass solid fuel is provided which, when exposed to rain water, has a reduced COD in discharged water and has low disintegration-property, while suppressing an increase in cost. The present invention relates to a biomass solid fuel obtained by molding pulverized biomass, having a fuel ratio (fixed carbon/volatile matter) of 0.2 to 0.8, dry-basis higher heating value of 4800 to 7000 (kcal/kg), a molar ratio of oxygen O to carbon C (O/C) of 0.1 to 0.7, and a molar ratio of hydrogen H to carbon C (H/C) is 0.8 to 1.3.

26 Claims, 12 Drawing Sheets

PBT

PAT

(51) Int. Cl.
  *C10L 5/28* (2006.01)
  *C10L 5/08* (2006.01)
(52) U.S. Cl.
  CPC ............... *C10L 5/44* (2013.01); *C10L 5/445* (2013.01); *C10L 5/363* (2013.01); *C10L 2200/0469* (2013.01); *C10L 2290/06* (2013.01); *C10L 2290/28* (2013.01); *C10L 2290/32* (2013.01); *Y02E 50/10* (2013.01); *Y02E 50/30* (2013.01)

(56) References Cited

U.S. PATENT DOCUMENTS

| | | | |
|---|---|---|---|
| 9,523,056 | B2* | 12/2016 | Hayashi ............... C10L 5/361 |
| 2007/0266623 | A1 | 11/2007 | Paoluccio |
| 2008/0051614 | A1 | 2/2008 | Ida et al. |
| 2010/0031560 | A1* | 2/2010 | Calabrese ............ C10L 5/445 44/550 |
| 2011/0179701 | A1* | 7/2011 | Grassi ................... C10L 5/442 44/606 |
| 2013/0312472 | A1* | 11/2013 | Brehmer ............... C10B 57/02 71/24 |
| 2015/0259616 | A1 | 9/2015 | Ono et al. |
| 2015/0315505 | A1 | 11/2015 | Hayashi et al. |

FOREIGN PATENT DOCUMENTS

| | | | | |
|---|---|---|---|---|
| JP | 2000319676 | A | 11/2000 | |
| JP | 2014098097 | A | 5/2014 | |
| JP | 2015067789 | A | 4/2015 | |
| KR | 1019990037945 | A | 5/1999 | |
| KR | 101171922 | B1 | 8/2012 | |
| KR | 101308869 | B1 | 9/2013 | |
| RU | 2355739 | C1 | 5/2009 | |
| RU | 2510660 | C2 | 4/2014 | |
| RU | 2013154067 | A | 6/2015 | |
| WO | 2008136477 | A1 | 11/2008 | |
| WO | 2010138514 | A2 | 12/2010 | |
| WO | 2012023479 | A1 | 2/2012 | |
| WO | 2012162403 | A1 | 11/2012 | |
| WO | 2014050964 | A1 | 4/2014 | |
| WO | WO-2014050964 | A1 * | 4/2014 | ............ C10L 5/442 |
| WO | 2014087949 | A1 | 6/2014 | |

OTHER PUBLICATIONS

Jaya Shankar Tumuluru, Shahab Sokhansanj, J. Richard Hess, Christopher T. Wright, A review on biomass torrefaction process and product properties for energy applications, 2011, Industrial Biotechnology, 384-402 (Year: 2011).*

Jaya Shankar Tumuluru, Shahab Sokhansanj, J. Richard Hess, Christopher T Wright, A Review on Biomass Torrefaction Process and Product Properties for Energy Applications, Oct. 2011, Industrial Biotechnology 7(5):384-401 (Year: 2011).*

Bahman Ghiasi, Linoj Kumar, Takaaki Furubayashi, Jim Lim, Xiaotao Bi, Chang Soo Kim, Shahab Sokhansanj, Densified biocoal from woodchips: Is it better to do torrefaction before or after densification?, Aug. 23, 2014, Applied Energy, 134, 133-142 (Year: 2014).*

International Search Report (ISR) dated Dec. 8, 2015, issued for International application No. PCT/JP2015/078552.

Notification of Transmittal of Translation of the International Preliminary Report on Patentability (PCT/IB/338) dated Apr. 20, 2017, with International Preliminary Report on Patentability (PCT/IB/373) and Written Opinion of the International Searching Authority (PCT/ISA/237), for corresponding international application PCT/JP2015/078552.

A Second Examination Report issued by the Australian Intellectual Property Office dated Apr. 26, 2018 for Australian counterpart application No. 2015329082.

Central Research Institute of Electric Power Industry, Development of an apparatus for evaluating characteristics of biomass carbonization, Central Research Institute of Electric Power Industry Report, 2012, Central Research Institute of Electric Power Industry.

Forest Research Institute, Raw material moisture content appropriate for Japanese cedar bark pellet manufacturing, Technology for dissemination, 2010, Forest Research Institute, Forestry Technology Division.

Kuroda et al., Manufacturing of a high-performance wood biomass fuel "hyper wood pellet", Selected Research Results, 2011, 16-17, Forestry and Forest Products Research Institute.

A First Examination Report issued by the Australian Intellectual Property Office dated Dec. 19, 2018 for Australian counterpart application No. 2018253504 (4 pages).

A First Examination Report issued by the Australian Intellectual Property Office dated Feb. 7, 2019 for Australian application No. 2017247418, submitted in co-pending U.S. application (5 pages).

A First Examination Report issued by the Australian Intellectual Property Office dated Jan. 5, 2018 for Australian counterpart application No. 2015329082 (5 pages).

A First Examination Report issued by the New Zealand Intellectual Property Office dated Apr. 12, 2018 for New Zealand counterpart application No. 730693 (6 pages).

A Further Examination Report issued by the New Zealand Intellectual Property Office dated Nov. 20, 2018 for New Zealand counterpart application No. 730693 (4 pages).

A Further Examination Report Postponed Acceptance issued by the New Zealand Intellectual Property Office dated Feb. 22, 2019 for New Zealand counterpart application No. 730693 (1 page).

A Notice of Reasons of Refusal issued by the Japanese Patent Office, dated Aug. 6, 2019, for Japanese counterpart application No. 2016-553146 (3 pages).

A Notice of Reasons of Refusal issued by the Japanese Patent Office, dated Dec. 4, 2018, for Japanese application No. 2018-510598, submitted in co-pending U.S. application. (4 pages).

A Notice of Reasons of Refusal issued by the Japanese Patent Office, dated Jan. 15, 2019, for Japanese application No. 2018-510598, submitted in co-pending U.S. application. (4 pages).

A Notification of Substantive Examination Result issued by the Republic of Indonesia, Directorate General of Intellectual Property, dated Mar. 18, 2019 for Indonesian counterpart application No. P00201702868 (2 pages).

A Result of the Substantive Examination issued by the Intellectual Property Office of Vietnam dated Apr. 28, 2020 for Vietnam counterpart application No. 1-2017-01676 (2 pages).

A Second Examination Report issued by the Australian Intellectual Property Office dated Sep. 16, 2019 for Australian application No. 2017247418, submitted in co-pending U.S. application (6 pages).

A Third Examination Report issued by the Australian Intellectual Property Office dated Jul. 27, 2018 for Australian counterpart application No. 2015329082 (3 pages).

An Official Action issued by the Russian Federal Service for Intellectual Property dated Apr. 20, 2020 for Russian application No. 2018138545, submitted in the co-pending U.S. application (10 pages).

Ghiasi et al., Feasibility of Pelletization and torrefaction of agricultural and woody biomass, The Canadian Society for Bioengineering, Jul. 5-8, 2015, Paper No. CSBE15-076 (12 pages).

International Search Report (ISR) dated Jun. 6, 2017, issued for International application No. PCT/JP2017/013990, Submitted in co-pending U.S. application (11 pages).

Kim, Young-Hun, Optimal condition of Torrefaction for high energy density solid fuel of fast growing tree species, 2015, Korean J. Chem Eng 32(8) 1547-1553 (7 pages).

Kleinschmidt, Overview of international developments in torrefaction, IEA Bioenergy Task 32, Jan. 28, 2011 (15 pages).

Non-Final Office Action issued by U.S. Patent and Trademark Office, dated Jan. 13, 2020, for a co-pending U.S. Appl. No. 16/090,473. (12 pages).

Notification of Transmittal of Translation of the International Preliminary Report on Patentability (PCT/IB/338) dated Oct. 18, 2018, with International Preliminary Report on Patentability (PCT/IB/373) and Written Opinion of the International Searching Authority (PCT/ISA/237), for international application PCT/JP2017/013990; Submitted in co-pending application (11 pages).

(56) References Cited

OTHER PUBLICATIONS

Final Office Action issued by U.S. Patent and Trademark Office, dated Oct. 16, 2020, for a co-pending U.S. Appl. No. 16/090,473. (14 pages).
A Notice of Preliminary Rejection issued by Korean Intellectual Property Office, dated Aug. 19, 2021, for Korean related application No. 1020187031769 (8 pages).
A Requisition by the examiner issued by Canadian Intellectual Property Office, dated Aug. 26, 2021, for Canadian counterpart application No. 2,962,744 (4 pages).
A Notification of Substantive Examination Result issued by the Republic of Indonesia, Directorate General of Intellectual Property, dated Nov. 25, 2020 for Indonesian counterpart application No. P00201808887 (3 pages).
A Decision of Refusal issued by the Japanese Patent Office, dated Aug. 3, 2021, for Japanese related application No. 2019-046217. (2 pages).
A Decision of Refusal issued by the Japanese Patent Office, dated Jun. 29, 2021, for Japanese counterpart application No. 2020-005272. (2 pages).
A Notice of Reasons for Refusal issued by the Japanese Patent Office, dated Feb. 9, 2021, for Japanese counterpart application No. 2020-005272. (2 pages).
A Requisition by the examiner issued by Canadian Intellectual Property Office, dated Jan. 28, 2022, for Canadian counterpart application No. 2,962,744 (4 pages).
A Result of the Substantive Examination issued by the Intellectual Property Office of Vietnam dated Jan. 24, 2022, for Vietnam related application No. 1-2018-04914 (14 pages).
A Notice of Allowance issued by U.S. Patent and Trademark Office, dated Apr. 20, 2022, for a co-pending U.S. Appl. No. 16/090,473. (11 pages).

\* cited by examiner

BIOMASS SOLID FUEL

This application is the U.S. National Phase under 35 U.S.C. § 371 of International Application PCT/JP2015/078552, filed Oct. 7, 2015, which claims priority to Japanese Patent Application No. 2014-206118, filed Oct. 7, 2014. The International Application was published under PCT Article 21(2) in a language other than English.

TECHNICAL FIELD

The present invention relates to a biomass solid fuel.

BACKGROUND ART

In the past, solid fuels obtained by molding wood-based biomasses are known. However, they have problems that handling thereof is difficult because they disintegrate when exposed to rain water and the like during outdoor storage, and also COD (chemical oxygen demand) of discharged water increases due to the elution of organic substances such as tar and the like. Therefore Patent Document 1 discloses a solid fuel obtained by performing molding and heating after steam exploding a plant-based starting material, in which the obtained solid fuel does not disintegrate when exposed to rain water and the like during outdoor storage although a binder and the like is not used, and in addition, the elution of tar component is prevented and COD in a discharged water is reduced.

CITATION LIST

Patent Document

Patent Document 1: Patent Application No. 2012-266635

SUMMARY OF INVENTION

Technical Problem

However the above prior art technology requires a step of steam explosion process, leading to increase in cost.

The present invention has been made to solve this problem, and the object thereof is to provide a biomass solid fuel which has low disintegration property and achieves a reduced COD in discharged water when exposed to rain water and the like, while suppressing an increase in cost.

Solution to Problem

A biomass solid fuel of the present invention is a biomass solid fuel obtained by molding pulverized biomass, and having a fuel ratio (fixed carbon/volatile matter) of 0.2 to 0.8, dry-basis higher heating value of 4800 to 7000 (kcal/kg), a molar ratio of oxygen O to carbon C (O/C) of 0.1 to 0.7, and a molar ratio of hydrogen H to carbon C (H/C) is 0.8 to 1.3.

Advantageous Effect of Invention

According to the present invention, there is provided a biomass solid fuel which has low disintegration property and achieves a reduced COD in discharged water when exposed to rain water, while suppressing an increase in cost, without the use of steam explosion process and a binder or the like.

DESCRIPTION OF EMBODIMENT

Figure 1:
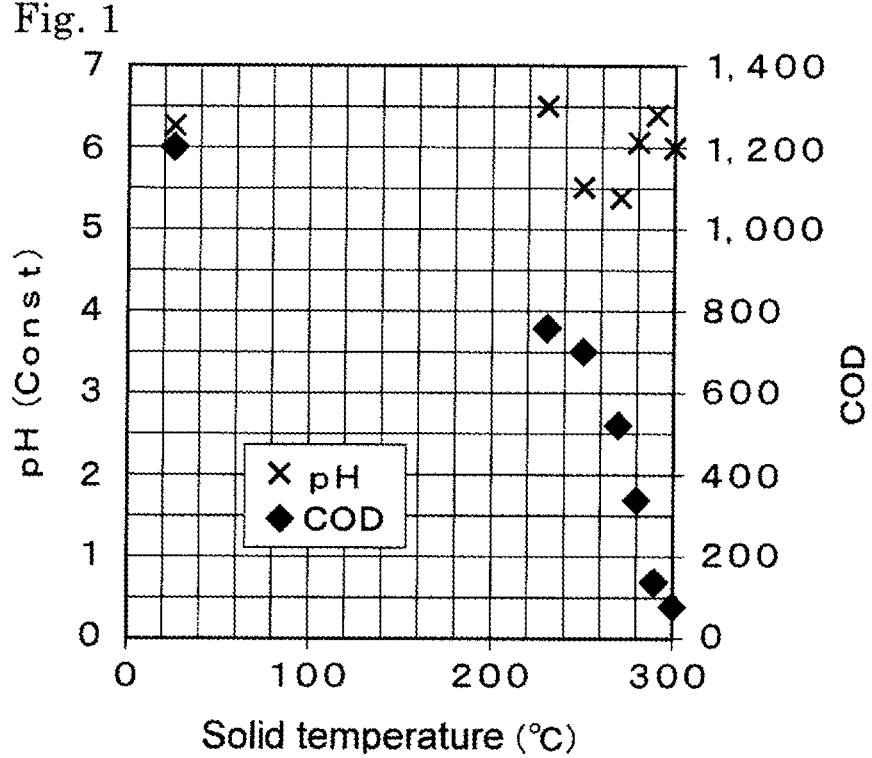
FIG. 1 is a graph showing COD and pH versus heating temperature of the biomass solid fuels.

The biomass solid fuel of the present invention is a molded solid product obtained by the steps including a molding step of compressing and molding biomass that has been crushed and pulverized to a state of debris or powder into biomass blocks, and a heating step of heating the biomass blocks. The molded solid product is used as a fuel (corresponding to PBT mentioned below). Since the biomass solid fuel of the present invention does not require a step of steam explosion and the use of a binder, the cost increase is suppressed. In the present specification, the biomass blocks obtained by molding process and before the heating step are also referred to as "unheated biomass blocks".

Biomass as a raw material may be any wood-based and herbaceous material, and tree species and parts thereof or the like are not particularly limited, but examples include douglas fir, hemlock, cedar, cypress, European red pine, almond old tree, almond shell, acacia xylem part, acacia bark, walnut shell, sago palm, EFB (empty fruit bunch that is a residue of palm oil processing), meranti, rubber tree and the like. These may be used alone or in a mixture of two or more of these.

In the molding process, the biomass blocks are formed by using known molding techniques. The biomass blocks are preferably in a form of pellet or briquette, and the size thereof is arbitrary. In the heating step, the molded biomass blocks are heated.

In a biomass solid fuel obtained after the heating step, the COD (Chemical Oxygen Demand) of an immersion water used for water immersion is preferably 3,000 ppm or less. In addition, COD ratio represented by (COD of biomass solid fuel after the heating step/COD of unheated biomass solid fuel) of the biomass solid fuel is preferably 0.98 or less. Here, the COD (Chemical Oxygen Demand) of an immersion water used for water immersion of a biomass solid fuel (simply, may be referred to as "COD") means a COD value assayed in accordance with JIS K0102(2010)-17 for a sample of immersion water for COD determination prepared in accordance with Japan Environment Agency Announcement No. 13 "(A) a method for detecting a metal or the like contained in an industrial waste", 1973.

The biomass solid fuel obtained after the heating step has a Hardgrove grindability index (HOT) in accordance with JIS M 8801 of preferably 15 or more and 60 or less, and more preferably 20 or more and 60 or less. Further, BET specific surface area thereof is 0.15 to 0.8 $m^2/g$, and more preferably 0.15 to 0.7 $m^2/g$. It is preferable that the equilibrium moisture content after immersion in water is 15 to 65 wt %, and more preferably 15 to 60 wt %.

The biomass solid fuel of the present invention has a fuel ratio (fixed carbon/volatile matter) of 0.2 to 0.8, a dry-basis higher heating value of 4,800 to 7000 (kcal/kg), a molar ratio of oxygen O to carbon C (O/C) of 0.1 to 0.7, and a molar ratio of hydrogen H to carbon C (H/C) of 0.8 to 1.3. If the biomass solid fuel has the physical properties within the above ranges, COD of a discharged water during storage can be reduced, disintegration can be reduced and handleability during storage can be improved. The biomass solid fuel of the present invention can be obtained by adjusting, for example, tree species of the biomass used as a raw material, parts of these, and heating temperature in the heating step and the like. Proximate analysis (industrial analysis) value, ultimate analysis (elemental analysis) value, and higher heating value in the present specification are based on JIS M 8812, 8813, and 8814.

The method of manufacturing a biomass solid fuel of the present invention comprises a molding step of molding pulverized biomass of the biomass that has been crushed and pulverized to obtain unheated biomass blocks, and a heating step of heating the unheated biomass blocks whereby providing a heated solid product, wherein the heating temperature in the heating step is preferably 150° C. to 400° C. With the temperature of the heating step within the above range, the biomass solid fuel having the above properties can be obtained. The heating temperature is appropriately determined depending on biomass raw materials and the shape and size of biomass blocks, but it is preferably 150 to 400° C., more preferably 200 to 350° C. Further preferably, it is 230 to 300° C. It is yet furthermore preferably 250 to 290° C. The heating time in the heating step is not particularly limited, but it is preferably 0.2 to 3 hours. The particle size of the pulverized biomass is not particularly limited, but the average size is about 100 to 3000 μm, and preferably 400 to 1000 μm. As the method of measuring the particle size of the pulverized biomass, known measurement methods may be used. Since mutual bonding or adhesion in the pulverized biomass is maintained by solid cross-linking in the biomass solid fuel (PBT) of the present invention as described below, the particle size of the pulverized biomass is not particularly limited as long as it is within a moldable range. Further, since the fine pulverization becomes a cause of cost increase, the particle size may be within a known range as long as both of cost and moldability can stand together.

When A denotes the bulk density of the unheated biomass blocks before heating step and B denotes the bulk density of the heated solid product after the heating step, it is preferred that B/A=0.7 to 1. The value of the bulk density A is not particularly limited as long as it is within such a known range that unheated biomass blocks can be obtained by molding the pulverized biomass. The bulk density varies depending on the kind of biomass raw materials, and thus it may be appropriately set. In addition, when H1 denotes HGI (Hardgrove grindability index of JIS M8801) of unheated biomass blocks and H2 denotes HGI of heated solid products, it is preferred that the H2/H1=1.1 to 2.5 is satisfied. By performing the heating so that one or both of the values of B/A and H2/H1 is within the ranges, it is possible to obtain a biomass solid fuel having improved handleability during storage by reducing disintegration while reducing the COD in the discharged water during storage.

Herein, characteristics of the biomass solid fuel may be determined in a preferable range depending on tree species of biomass used as a raw material. Hereinafter, an example thereof will be described, but the present invention is not limited to these tree species and combinations thereof. Hereinafter, preferred ranges will be described about species of biomass raw materials used in the present invention and properties of the obtained solid fuels (corresponding to PBT as mentioned below) and their manufacturing method, respectively.

[Species of Biomass Raw Material and Properties of Solid Fuel]

(Douglas Fir, Hemlock, Cedar and Cypress: Solid Fuel A)

As an aspect of the present invention, when a raw material contains at least one species selected from douglas fir, hemlock, cedar and cypress, the properties of a biomass solid fuel (hereinafter, may be referred to as a solid fuel A) is as follows.

COD thereof is preferably 1000 ppm or less, more preferably 900 ppm or less, further more preferably 800 ppm or less, and COD ratio thereof is preferably 0.80 or less, more preferably 0.70 or less, and further more preferably 0.68 or less.

The equilibrium moisture content after immersion in water thereof (described later) is preferably 15 wt % to 45 wt %, more preferably 18 wt % to 35 wt %, and further more preferably 18 wt % to 32 wt %.

The BET specific surface area thereof is preferably 0.25 $m^2/g$ to 0.8 $m^2/g$, more preferably 0.28 $m^2/g$ to 0.6 $m^2/g$, and further more preferably 0.32 $m^2/g$ to 0.5 $m^2/g$.

The HGI thereof is preferably 20 to 60, more preferably 20 to 55, and further more preferably 22 to 55. Since HGI of coal (bituminous coal) suitable as a boiler fuel for electric power generation is about 50, HGI closer to about 50 is preferable, considering that it is mixed and ground with coal. HGI ratio (described later) is preferably 1.0 to 2.5.

The fuel ratio thereof is preferably 0.2 to 0.8, more preferably 0.2 to 0.7, and further more preferably 0.2 to 0.65.

The dry-basis higher heating value thereof is preferably 4800 to 7000 kcal/kg, more preferably from 4900 to 7000 kcal/kg, and further more preferably 4950 to 7000 kcal/kg.

The molar ratio of oxygen O to carbon C (O/C) thereof is preferably 0.1 to 0.62, more preferably 0.1 to 0.61, and further more preferably 0.1 to 0.60.

The molar ratio of hydrogen H to carbon C (H/C) thereof is preferably 0.8 to 1.3, more preferably 0.85 to 1.3, and further more preferably 0.9 to 1.3.

The foregoing description is the preferred range of properties of the solid fuel A.

In addition, when manufacturing the solid fuel A, the heating temperature in the heating step is preferably 200 to 350° C., more preferably 210 to 330° C., and further more preferably 220 to 300° C.

(European Red Pine: Solid Fuel B)

As an aspect of the present invention, when a raw material is European red pine, the properties of a biomass solid fuel (hereinafter, may be referred to as a solid fuel B) is as follows.

COD thereof is preferably 900 ppm or less, more preferably 800 ppm or less, further more preferably 700 ppm or less, and COD ratio thereof is preferably 0.75 or less, more preferably 0.68 or less, and further more preferably 0.64 or less.

The equilibrium moisture content after immersion in water thereof is preferably 15 wt % to 45 wt %, more preferably 18 wt % to 40 wt %, and further more preferably 18 wt % to 31 wt %.

The BET specific surface area thereof is preferably 0.30 $m^2$/g to 0.7 $m^2$/g, more preferably 0.30 $m^2$/g to 0.6 $m^2$/g, and further more preferably 0.30 $m^2$/g to 0.5 $m^2$/g.

The HGI thereof is preferably 25 to 60, more preferably 30 to 55, and further more preferably 35 to 55. HGI ratio (described later) is preferably 1.0 to 2.5.

The fuel ratio thereof is preferably 0.2 to 0.8, more preferably 0.2 to 0.7, and further more preferably 0.2 to 0.65.

The dry-basis higher heating value thereof is preferably 4950 to 7000 kcal/kg, more preferably from 5000 to 7000 kcal/kg, and further more preferably 5100 to 7000 kcal/kg.

The molar ratio of oxygen O to carbon C (O/C) thereof is preferably 0.1 to 0.60, more preferably 0.2 to 0.60, and further more preferably 0.3 to 0.60.

The molar ratio of hydrogen H to carbon C (H/C) thereof is preferably 0.8 to 1.3, more preferably 0.85 to 1.3, and further more preferably 0.9 to 1.3.

The foregoing description is the preferred range of properties of the solid fuel B.

In addition, when manufacturing the solid fuel B, the heating temperature in the heating step is preferably 200 to 350° C., more preferably 220 to 300° C., and further more preferably 240 to 290° C.

(Almond Old Tree: Solid Fuel C)

As an aspect of the present invention, when a raw material is almond old tree, the properties of a biomass solid fuel (hereinafter, may be referred to as a solid fuel C) is as follows.

COD thereof is preferably 2100 ppm or less, more preferably 2000 ppm or less, further more preferably 1500 ppm or less, and COD ratio thereof is preferably 0.80 or less, more preferably 0.75 or less, and further more preferably 0.55 or less.

The equilibrium moisture content after immersion in water thereof is preferably 25 wt % to 60 wt %, more preferably 30 wt % to 50 wt %, and further more preferably 30 wt % to 45 wt %.

The BET specific surface area thereof is preferably 0.20 $m^2$/g to 0.70 $m^2$/g, more preferably 0.22 $m^2$/g to 0.65 $m^2$/g, and further more preferably 0.25 $m^2$/g to 0.60 $m^2$/g.

The HGI thereof is preferably 15 to 60, more preferably 18 to 55, and further more preferably 20 to 55. HGI ratio (described later) is preferably 1.0 to 2.0.

The fuel ratio thereof is preferably 0.2 to 0.8, more preferably 0.25 to 0.7, and further more preferably 0.3 to 0.65.

The dry-basis higher heating value thereof is preferably 4800 to 7000 kcal/kg, more preferably from 4800 to 6500 kcal/kg, and further more preferably 4900 to 6500 kcal/kg.

The molar ratio of oxygen O to carbon C (O/C) thereof is preferably 0.10 to 0.70, more preferably 0.20 to 0.60, and further more preferably 0.30 to 0.60.

The molar ratio of hydrogen H to carbon C (H/C) thereof is preferably 0.8 to 1.3, more preferably 0.85 to 1.3, and further more preferably 0.9 to 1.20.

The foregoing description is the preferred range of properties of the solid fuel C.

In addition, when manufacturing the solid fuel C, the heating temperature in the heating step is preferably 200 to 350° C., more preferably 220 to 300° C., and further more preferably 240 to 290° C.

(Mixture of Almond Shell and Almond Old Tree: Solid Fuel D)

As an aspect of the present invention, when a raw material is a mixture of almond shell and almond old tree, the properties of a biomass solid fuel (hereinafter, may be referred to as a solid fuel D) is as follows.

COD thereof is preferably 2500 ppm or less, more preferably 2000 ppm or less, further more preferably 1500 ppm or less, and COD ratio thereof is preferably 0.75 or less, more preferably 0.68 or less, and further more preferably 0.50 or less.

The equilibrium moisture content after immersion in water thereof is preferably 15 wt % to 50 wt %, more preferably 20 wt % to 40 wt %, and further more preferably 20 wt % to 35 wt %.

The BET specific surface area thereof is preferably 0.20 $m^2$/g to 0.70 $m^2$/g, more preferably 0.27 $m^2$/g to 0.70 $m^2$/g, and further more preferably 0.30 $m^2$/g to 0.60 $m^2$/g.

The HGI thereof is preferably 20 to 60, more preferably 20 to 55, and further more preferably 23 to 55. HGI ratio (described later) is preferably 1.0 to 2.0.

The fuel ratio thereof is preferably 0.2 to 0.8, more preferably 0.30 to 0.7, and further more preferably 0.35 to 0.65.

The dry-basis higher heating value thereof is preferably 4800 to 7000 kcal/kg, more preferably from 4800 to 6500 kcal/kg, and further more preferably 4900 to 6300 kcal/kg.

The molar ratio of oxygen O to carbon C (O/C) thereof is preferably 0.10 to 0.70, more preferably 0.20 to 0.60, and further more preferably 0.30 to 0.55.

The molar ratio of hydrogen H to carbon C (H/C) thereof is preferably 0.8 to 1.3, more preferably 0.8 to 1.25, and further more preferably 0.85 to 1.20.

The foregoing description is the preferred range of properties of the solid fuel D.

In addition, when manufacturing the solid fuel D, the heating temperature in the heating step is preferably 200 to 350° C., more preferably 220 to 300° C., and further more preferably 240 to 290° C.

(Acacia Xylem Part: Solid Fuel E)

As an aspect of the present invention, when a raw material is acacia xylem part, the properties of a biomass solid fuel (hereinafter, may be referred to as a solid fuel E) is as follows.

COD thereof is preferably 950 ppm or less, more preferably 850 ppm or less, further more preferably 800 ppm or less, and COD ratio thereof is preferably 0.95 or less, more preferably 0.85 or less, and further more preferably 0.80 or less.

The equilibrium moisture content after immersion in water thereof is preferably 20 wt % to 60 wt %, more preferably 20 wt % to 55 wt %, and further more preferably 23 wt % to 53 wt %.

The BET specific surface area thereof is preferably 0.40 $m^2/g$ to 0.70 $m^2/g$, more preferably 0.50 $m^2/g$ to 0.70 $m^2/g$, and further more preferably 0.55 $m^2/g$ to 0.70 $m^2/g$.

The fuel ratio thereof is preferably 0.2 to 0.6, more preferably 0.2 to 0.5, and further more preferably 0.2 to 0.4.

The dry-basis higher heating value thereof is preferably 4800 to 7000 kcal/kg, more preferably from 4800 to 6000 kcal/kg, and further more preferably 4800 to 5500 kcal/kg.

The molar ratio of oxygen O to carbon C (O/C) thereof is preferably 0.40 to 0.70, more preferably 0.45 to 0.70, and further more preferably 0.48 to 0.65.

The molar ratio of hydrogen H to carbon C (H/C) thereof is preferably 0.8 to 1.3, more preferably 1.0 to 1.3, and further more preferably 1.1 to 1.3.

The foregoing description is the preferred range of properties of the solid fuel E.

In addition, when manufacturing the solid fuel E, the heating temperature in the heating step is preferably 200 to 350° C., more preferably 220 to 300° C., and further more preferably 240 to 290° C.

(Acacia Bark: Solid Fuel F)

As an aspect of the present invention, when a raw material is acacia bark, the properties of a biomass solid fuel (hereinafter, may be referred to as a solid fuel F) is as follows.

COD thereof is preferably 2500 ppm or less, more preferably 2000 ppm or less, further more preferably 1200 ppm or less, and COD ratio thereof is preferably 0.30 or less, more preferably 0.20 or less, and further more preferably 0.15 or less.

The equilibrium moisture content after immersion in water thereof is preferably 15 wt % to 50 wt %, more preferably 20 wt % to 45 wt %, and further more preferably 25 wt % to 40 wt %.

The BET specific surface area thereof is preferably 0.35 $m^2/g$ to 0.55 $m^2/g$, more preferably 0.40 $m^2/g$ to 0.55 $m^2/g$, and further more preferably 0.40 $m^2/g$ to 0.50 $m^2/g$.

The fuel ratio thereof is preferably 0.4 to 0.8, more preferably 0.42 to 0.75, and further more preferably 0.45 to 0.75.

The dry-basis higher heating value thereof is preferably 4800 to 7000 kcal/kg, more preferably from 5000 to 7000 kcal/kg, and further more preferably 5200 to 6500 kcal/kg.

The molar ratio of oxygen O to carbon C (O/C) thereof is preferably 0.25 to 0.60, more preferably 0.30 to 0.60, and further more preferably 0.30 to 0.55.

The molar ratio of hydrogen H to carbon C (H/C) thereof is preferably 0.8 to 1.3, more preferably 0.8 to 1.2, and further more preferably 0.9 to 1.2.

The foregoing description is the preferred range of properties of the solid fuel F.

In addition, when manufacturing the solid fuel F, the heating temperature in the heating step is preferably 200 to 350° C., more preferably 220 to 300° C., and further more preferably 240 to 290° C.

(Mixture of almond shell and walnut shell: Solid fuel G)

As an aspect of the present invention, when a raw material is a mixture of almond shell and walnut shell, the properties of a biomass solid fuel (hereinafter, may be referred to as a solid fuel G) is as follows.

COD thereof is preferably 2500 ppm or less, more preferably 2100 ppm or less, further more preferably 1500 ppm or less, and COD ratio thereof is preferably 0.65 or less, more preferably 0.55 or less, and further more preferably 0.45 or less.

The equilibrium moisture content after immersion in water thereof is preferably 20 wt % to 45 wt %, more preferably 20 wt % to 40 wt %, and further more preferably 25 wt % to 35 wt %.

The BET specific surface area thereof is preferably 0.15 $m^2/g$ to 0.35 $m^2/g$, more preferably 0.19 $m^2/g$ to 0.33 $m^2/g$, and further more preferably 0.20 $m^2/g$ to 0.30 $m^2/g$.

The HGI thereof is preferably 18 to 60, and more preferably 20 to 60. HGI ratio (described later) is preferably 1.0 or more.

The fuel ratio thereof is preferably 0.2 to 0.7, more preferably 0.25 to 0.65, and further more preferably 0.28 to 0.60.

The dry-basis higher heating value thereof is preferably 4800 to 7000 kcal/kg, more preferably from 4800 to 6000 kcal/kg, and further more preferably 5000 to 6000 kcal/kg.

The molar ratio of oxygen O to carbon C (O/C) thereof is preferably 0.30 to 0.65, more preferably 0.40 to 0.70, and further more preferably 0.40 to 0.60.

The molar ratio of hydrogen H to carbon C (H/C) thereof is preferably 0.8 to 1.3, more preferably 0.9 to 1.25, and further more preferably 0.9 to 1.2.

The foregoing description is the preferred range of properties of the solid fuel G.

In addition, when manufacturing the solid fuel G, the heating temperature in the heating step is preferably 200 to 350° C., more preferably 220 to 300° C., and further more preferably 240 to 290° C.

(Sago: Solid Fuel H)

As an aspect of the present invention, when a raw material is sago, the properties of a biomass solid fuel (hereinafter, may be referred to as a solid fuel H) is as follows.

COD thereof is preferably 2000 ppm or less, more preferably 1600 ppm or less, further more preferably 800 ppm or less, and COD ratio thereof is preferably 0.85 or less, more preferably 0.60 or less, and further more preferably 0.4 or less.

The equilibrium moisture content after immersion in water thereof is preferably 20 wt % to 35 wt %, more preferably 20 wt % to 33 wt %, and further more preferably 22 wt % to 30 wt %.

The BET specific surface area thereof is preferably 0.15 $m^2/g$ to 0.35 $m^2/g$, more preferably 0.18 $m^2/g$ to 0.33 $m^2/g$, and further more preferably 0.18 $m^2/g$ to 0.30 $m^2/g$.

The HGI thereof is preferably 20 to 60, more preferably 25 to 55, and further more preferably 30 to 55. HGI ratio (described later) is preferably 1.0 to 2.5, more preferably 1.3 to 2.3 and further more preferably 1.5 to 2.2.

The fuel ratio thereof is preferably 0.2 to 0.8, more preferably 0.25 to 0.8, and further more preferably 0.5 to 0.8.

The dry-basis higher heating value thereof is preferably 4800 to 7000 kcal/kg, more preferably from 4900 to 6500 kcal/kg, and further more preferably 5000 to 6000 kcal/kg.

The molar ratio of oxygen O to carbon C (O/C) thereof is preferably 0.20 to 0.65, more preferably 0.20 to 0.60, and further more preferably 0.2 to 0.55.

The molar ratio of hydrogen H to carbon C (H/C) thereof is preferably 0.8 to 1.3, more preferably 0.85 to 1.3, and further more preferably 0.85 to 1.2.

The foregoing description is the preferred range of properties of the solid fuel H.

In addition, when manufacturing the solid fuel H, the heating temperature in the heating step is preferably 200 to 350° C., more preferably 220 to 300° C., and further more preferably 240 to 290° C.

(EFB: Solid Fuel I)

As an aspect of the present invention, when a raw material is EFB (empty fruit bunch that is residue of palm oil processing), the properties of a biomass solid fuel (hereinafter, may be referred to as a solid fuel I) is as follows.

COD thereof is preferably 2350 ppm or less, more preferably 2300 ppm or less, further more preferably 2000 ppm or less, and COD ratio thereof is preferably 0.98 or less, more preferably 0.96 or less, and further more preferably 0.85 or less.

The equilibrium moisture content after immersion in water thereof is preferably 23 wt % to 45 wt %, more preferably 20 wt % to 40 wt %, and further more preferably 20 wt % to 35 wt %.

The BET specific surface area thereof is preferably 0.25 $m^2/g$ to 0.65 $m^2/g$, more preferably 0.30 $m^2/g$ to 0.60 $m^2/g$, and further more preferably 0.35 $m^2/g$ to 0.55 $m^2/g$.

The fuel ratio thereof is preferably 0.25 to 0.8, more preferably 0.30 to 0.8, and further more preferably 0.36 to 0.8.

The dry-basis higher heating value thereof is preferably 4800 to 7000 kcal/kg, more preferably from 4900 to 7000 kcal/kg, and further more preferably 5000 to 7000 kcal/kg.

The molar ratio of oxygen O to carbon C (O/C) thereof is preferably 0.15 to 0.65, more preferably 0.15 to 0.60, and further more preferably 0.15 to 0.55.

The molar ratio of hydrogen H to carbon C (H/C) thereof is preferably 0.5 to 1.3, more preferably 0.55 to 1.3, and further more preferably 0.6 to 1.2.

The foregoing description is the preferred range of properties of the solid fuel I.

In addition, when manufacturing the solid fuel I, the heating temperature in the heating step is preferably 200 to 350° C., more preferably 220 to 300° C., and further more preferably 240 to 260° C.

(Meranti: Solid Fuel J)

As an aspect of the present invention, when a raw material is meranti, the properties of a biomass solid fuel (hereinafter, may be referred to as a solid fuel J) is as follows.

COD thereof is preferably 330 ppm or less, more preferably 320 ppm or less, further more preferably 300 ppm or less, and COD ratio thereof is preferably 0.98 or less, more preferably 0.95 or less, and further more preferably 0.90 or less.

The equilibrium moisture content after immersion in water thereof is preferably 15 wt % to 30 wt %, more preferably 15 wt % to 27 wt %, and further more preferably 18 wt % to 25 wt %.

The fuel ratio thereof is preferably 0.2 to 0.6, more preferably 0.2 to 0.5, and further more preferably 0.2 to 0.45.

The dry-basis higher heating value thereof is preferably 4800 to 7000 kcal/kg, more preferably from 4800 to 6500 kcal/kg, and further more preferably 4800 to 6000 kcal/kg.

The molar ratio of oxygen O to carbon C (O/C) thereof is preferably 0.3 to 0.60, more preferably 0.35 to 0.60, and further more preferably 0.40 to 0.60.

The molar ratio of hydrogen H to carbon C (H/C) thereof is preferably 0.9 to 1.2, more preferably 0.95 to 1.2, and further more preferably 1.0 to 1.2.

The foregoing description is the preferred range of properties of the solid fuel J.

In addition, when manufacturing the solid fuel J, the heating temperature in the heating step is preferably 200 to 350° C., more preferably 220 to 300° C., and further more preferably 230 to 290° C.

(Rubber Tree: Solid Fuel K)

As an aspect of the present invention, when a raw material is rubber tree, the properties of a biomass solid fuel (hereinafter, may be referred to as a solid fuel K) is as follows.

The fuel ratio thereof is preferably 0.2 to 0.8, and more preferably 0.2 to 0.7. The dry-basis higher heating value is preferably 4800 to 7000 kcal/kg.

The molar ratio of oxygen O to carbon C (O/C) thereof is preferably 0.1 to 0.70. The molar ratio of hydrogen H to carbon C (H/C) thereof is preferably 0.8 to 1.3.

The foregoing description is the preferred range of properties of the solid fuel K.

In addition, when manufacturing the solid fuel K, the heating temperature in the heating step is preferably 200 to 350° C., more preferably 220 to 300° C., and further more preferably 230 to 290° C.

The present inventors presume that, in the method of manufacturing the biomass solid fuel, because the method has such an order of the steps that the heating step of heating the unheated biomass blocks is performed after the molding step, mutual bonding or adhesion in the pulverized biomass is maintained by using components originated from the raw material biomass without using a binder, which enables the production of biomass solid fuels having high water-resistant which do not disintegrate by immersion in water. According to the analysis of the present inventors, the following findings are obtained regarding the mechanism that the biomass solid fuels acquire water resistance.

The present inventors performed FT-IR analysis, GC-MS analysis, and SEM observation about three types of biomass solid fuels manufactured by different production methods, specifically an unheated solid fuel obtained by molding pulverized biomass (White Pellet: hereinafter may be referred to as WP), and a solid fuel obtained by heating after molding pulverized biomass (Pelletizing Before Torrefaction; hereinafter may be referred to as PBT), and analyzed the mechanism of water resistance of the biomass solid fuels. Herein, binders were not used either in WP and PBT.

First, acetone extracts of the respective solid fuels were analyzed by FT-IR. In the PBT obtained through the heating step, content of hydrophilic COOH groups is in small, but content of C=C bond is large as compared with the unheated WP. This suggests that the chemical structure of the components constituting the biomass has changed and has become hydrophobic by heating.

In addition, the acetone extract components of the respective solid fuels were analyzed by GC-MS analysis. It is suggested that terpenes such as abietic acid and derivatives thereof (hereinafter, may be referred to as "abietic acid and the like") have thermally decomposed by heating, and this fact relates to the water resistance of the biomass solid fuel. The abietic acid and the like are main components of rosins contained in pine and the like.

Figure 18:
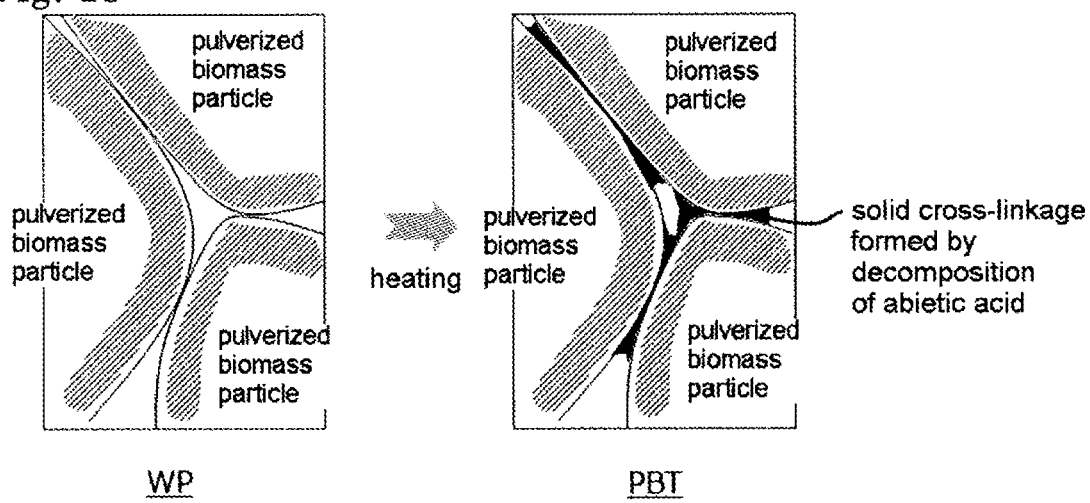
FIG. 18 is a diagram showing (estimated) mechanism of the development of solid cross-links in PBT.
Figure 19:
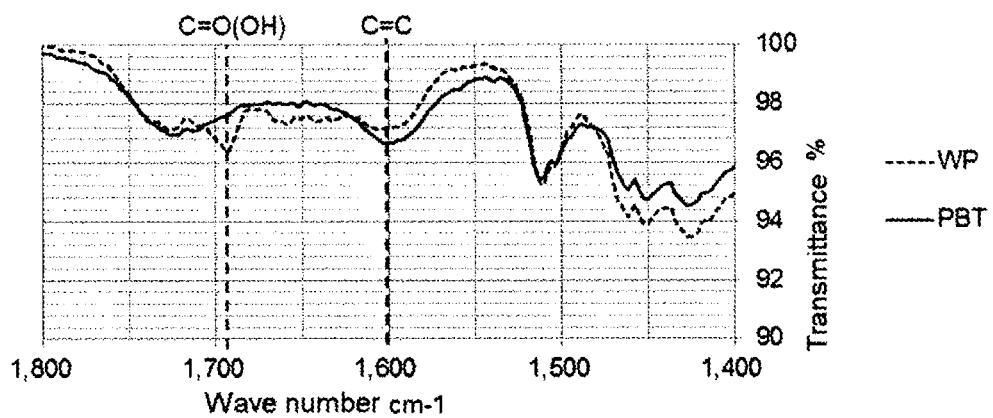
FIG. 19 is a chart showing the results of FT-IR analysis of the outer surface of pellets of the biomass solid fuels.
Figure 20:
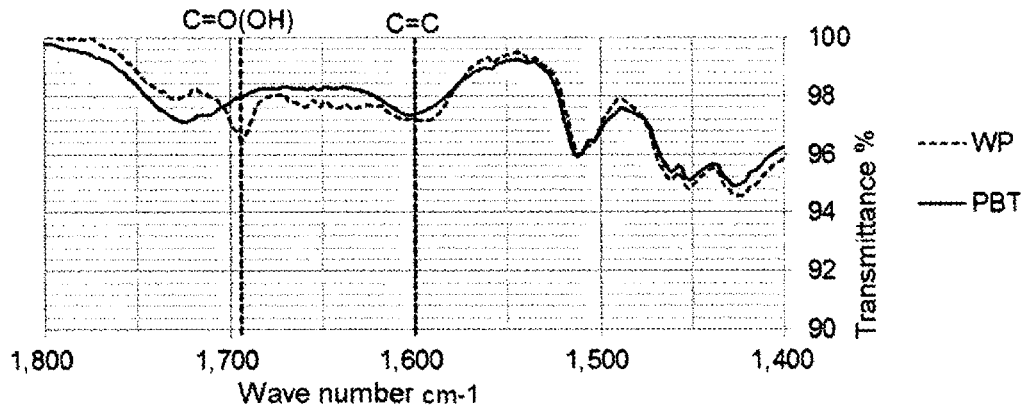
FIG. 20 is a chart showing the results of FT-IR analysis of the cross-sectional center of pellets of the biomass solid fuels.
Figure 21:
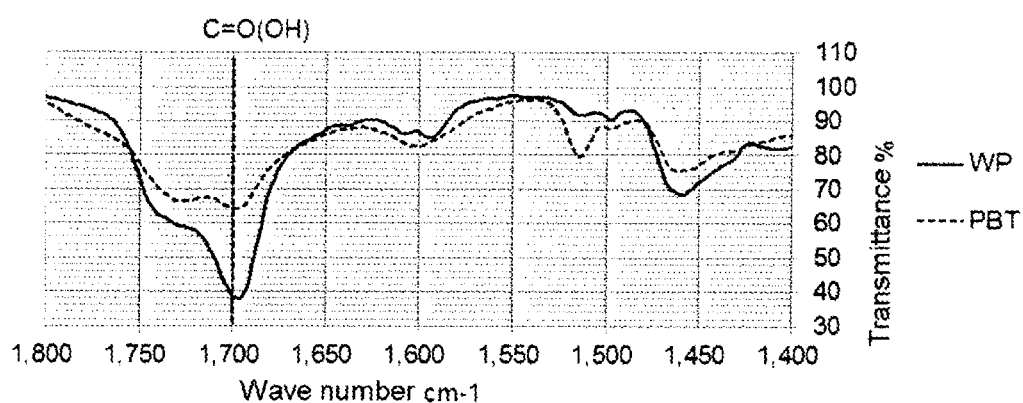
FIG. 21 is a chart showing the results of FT-IR analysis of acetone extract solution of the biomass solid fuels.
Figure 22:
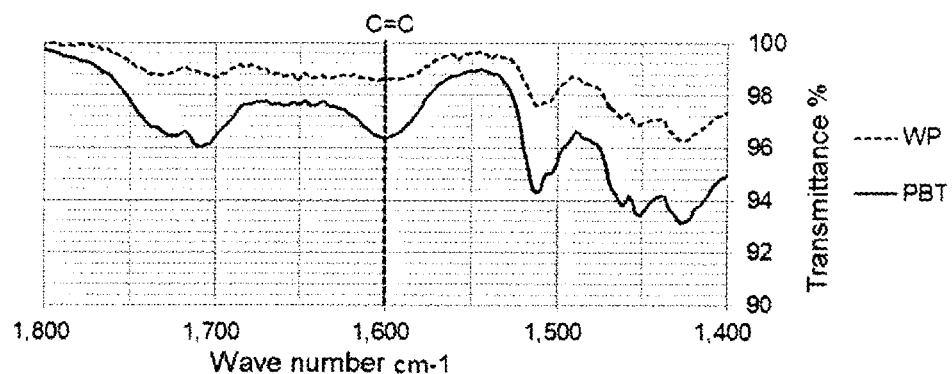
FIG. 22 is a chart showing the results of FT-IR analysis of the solid of biomass solid fuels after acetone extract.

FIG. 18 is a diagram illustrating a (estimated) mechanism of the development of solid cross-linking in PBT. In the case of PBT, in the heating step after the molding step, melted liquid of the abietic acid elutes in the gap between biomass (the gap between adjacent pulverized biomass particles that have been compacted by molding after pulverizing; herein the biomass may be referred to as pulverized biomass) with the rise of temperature, and the evaporation and thermal decomposition of abietic acid take place to form hydrophobic materials, which are fixed in the gap between the pulverized biomass particles to develop cross-linkage (solid cross-linkage). Thus, without the addition of a binder, mutual bonding or adhesion in the pulverized biomass is maintained by the abietic acid and the like derived from biomass raw material. Thus, it is speculated that because pulverized biomass particles are connected or bonded to each other to prevent water penetration, water resistance is improved.

On the other hand, in the case of WP which is unheated and obtained only by molding pulverized biomass, no solid cross-linkage of the pulverized biomass between powder particles exists unlike the above PBT. Since there are a lot of hydrophilic COOH group and the like on the surface of raw pulverized biomass constituting the WP, water easily enters. The penetrated water expands the gap between the pulverized biomass particles wider, and thus, the molded pellets and the like disintegrate easily.

Furthermore, in the case of solid fuels molded after heating the pulverized biomass (Pelletizing After Torrefaction; hereinafter may be referred to as PAT), the individual pulverized biomass particles themselves become hydrophobic on the surface due to elution of abietic acid etc. However, since the pulverizing and molding is performed after they become hydrophobic by heating, formation of the cross-linkage between the pulverized biomass particles are not expected unlike the above PBT. Therefore, in the case of PAT in which heating is performed before the molding, water easily penetrates into the gap between the compacted pulverized biomass particles, and thus it has poor water resistance as compared with PBT.

The melting point of abietic acid or derivatives thereof is about 139 to 142° C., and the boiling point is about 250° C. Thus, abietic acid and the like melt by heating at temperature near the melting point to form liquid cross-linkage, and abietic acid and the like decompose thermally at temperature near the boiling point to develop the formation of solid cross-linkage.

It should be noted that terpenes, including abietic acid, are contained in biomass in general (see, Hokkaido Forest Products Research Institute monthly report 171, April 1966, Public Interest Incorporated Association Japan Wood Protection Association, "Wood Preservation" Vol. 34-2 (2008), etc.). Although there are small differences in content depending on the type of biomass (see, "use of essential oil", Ohira Tatsuro, Japan Wood Society the 6th Research Subcommittee Report p72, Table 1, Japan Wood Society 1999, etc.), all of <Example A> to <Example I> described below showed the generation of water resistance by heating 230° C. or higher (disintegration does not occur even after immersion in water, see Table 6), and therefore it is considered that the heating the biomass in general at temperature at least 230° C. or higher to 250° C. or higher provides water resistance.

FIGS. 19 to 22 are charts showing the results of FT-IR analysis of a biomass solid fuel of the present invention. The raw material is a European pine of Example B below, and the analysis was made to a heated solid fuel (PBT) obtained by pulverizing and molding the raw material to a pellet form and heating at 250° C. In addition, the data of unheated solid fuel (WP) obtained by pulverizing and molding the same raw material, but with no heating is also shown. Both in the outer surface of the pellet (FIG. 19) and in cross-sectional center (FIG. 20), the amount of COOH groups is WP>PBT, and the amount of C=C bonds is PBT>WP. Further, the amount of COOH group eluted into acetone extract (FIG. 21) is WP>PBT, indicating that PBT has less hydrophilic COOH groups. In addition, in the solids after acetone extraction (FIG. 22), the PBT has more C=C bonds than WP. Thus, it is understood that PBT is excellent in water resistance.

Figure 23:
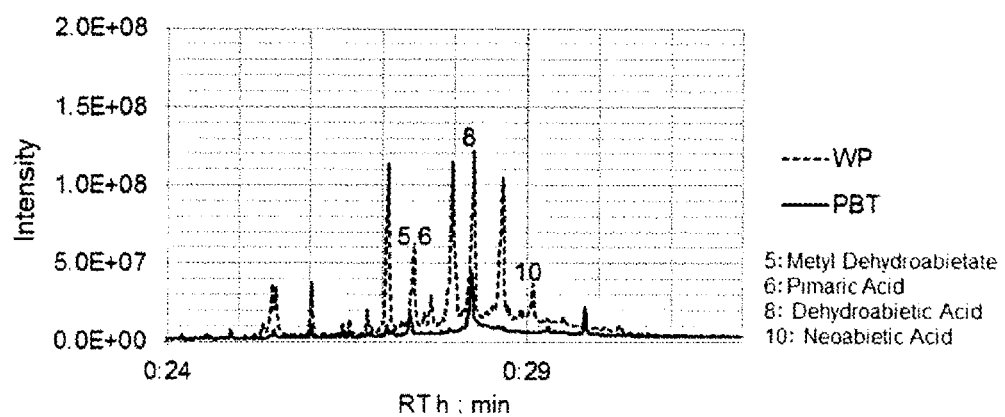
FIG. 23 is a chart showing the results of GC-MS analysis of acetone extract solution of the biomass solid fuels.

FIG. 23 is a chart showing the results of GC-MS analysis of the acetone extract solution. The raw materials is a European pine of Example B as is the same for the above-mentioned FIGS. 19 to 22, and the analysis was made to a heated solid fuel (PBT) obtained by pulverizing and molding the raw material to a pellet form and heating at 250° C. and an unheated solid fuel (WP). As shown in FIG. 23, the eluted amount of the abietic acid and the like, which is a kind of terpenes, to acetone is smaller in the case of PBT than in the case of WP. Thus, the results are considered showing that abietic acid melted by heating to form liquid cross-linkage, and solid cross-linkage was formed by the volatilization of abietic acid and the like.

In addition, in the case of PBT, the strength of the solid fuel is improved due to the development of the solid cross-linking, and therefore it is presumed that good grindability (HGT described later, pulverizing rate) and good handleability (disintegration test described below) is obtained without the addition of a binder, by heating at least 230° C. or higher to 250° C. or higher as similar to the water resistance. As mentioned above, COD is reduced when PBT is used. This is considered because the tar component of the biomass raw material volatilizes by heating, and at the same time the solidified abietic acid and the like covers the surface of solid fuel PBT, which further increases hydrophobicity of the surface of the solid fuel to prevent the elution of tar component remaining in the biomass raw material.

EXAMPLE

Example A

Examples A-1 to A-6

A biomass solid fuel A (PBT) was obtained through a molding step of pulverizing biomass after crushing and molding the pulverized biomass, and subsequent heating step. The binder is not used in any step. The biomass raw material used is a mixture of douglas fir 40% by weight, hemlock 58% by weight, cedar 1% by weight and cypress 1% by weight. In the molding process of each Example, the raw material was molded into a pellet shape with a diameter of 8 mm. In the heating step of each Example, 4 kg of raw material is charged in an electric batch furnace having 600 mm diameter and heated to target temperatures (heating temperature in Table 1) in respective Examples with a heating rate of 2° C./min. Hereinafter, the target temperature and the heating temperature refer to the same meaning. In Examples A-1 to A-6, temperature was not maintained at the target temperature (heating temperature) (this also applies to the following Examples B to K). Table 1 shows the heating temperature of the heating step in Examples A-1 to A-6 and the properties of the resulting biomass solid fuel A obtained after the heating step.

Comparative Example A

Comparative Example A is an unheated biomass solid fuel (WP) which is obtained only by molding after crushing and pulverizing, and is not through the heating step. A binder is not used also in Comparative Example A. Raw biomass is the same as in Example A-1. Table 1 also shows the properties of the resulting solid fuel of Comparative Example A.

In Table 1, HGI is based on JIS M 8801 as described, and the larger value indicates better grindability. Table 1 shows a higher heating value (dry-basis), a fuel ratio calculated based on proximate analysis values (air dried basis), and results of ultimate analysis values (air dried basis) and molar ratios of oxygen O, carbon C and hydrogen H obtained based on the ultimate analysis.

TABLE 1

| | | | Comparative | Example | | | | | |
|---|---|---|---|---|---|---|---|---|---|
| | | | Example A unheated | A-1 230° C. | A-2 250° C. | A-3 270° C. | A-4 280° C. | A-5 290° C. | A-6 300° C. |
| Samples <Example A> | | | WP | | | PBT | | | |
| proximate analysis | moisture content | wt %-AD | 11.0 | 8.4 | 7.7 | 7.2 | 6.9 | 6.7 | 6.3 |
| | ash content | wt %-AD | 0.6 | 0.6 | 0.5 | 0.5 | 0.6 | 0.7 | 0.9 |
| | volatile matter | wt %-AD | 73.6 | 74.1 | 74.5 | 70.9 | 68.9 | 64.8 | 57.4 |
| | fixed carbon | wt %-AD | 14.8 | 16.9 | 17.3 | 21.4 | 23.6 | 27.8 | 35.4 |
| fuel ratio | | — | 0.2 | 0.2 | 0.2 | 0.3 | 0.3 | 0.4 | 0.6 |
| higher heating value | | kcal/kg-dry | 4,719 | 5,000 | 5,146 | 5,366 | 5,478 | 5,734 | 6,105 |
| ultimate analysis | ash content | wt %-dry | 0.7 | 0.7 | 0.5 | 0.6 | 0.7 | 0.7 | 1.0 |
| | carbon | wt %-dry | 50.7 | 52.2 | 53.4 | 56.0 | 57.2 | 60.0 | 63.9 |
| | hydrogen | wt %-dry | 5.5 | 5.6 | 5.7 | 5.5 | 5.4 | 5.2 | 5.2 |
| | oxygen | wt %-dry | 42.7 | 41.2 | 40.0 | 37.5 | 36.4 | 33.9 | 29.5 |
| | nitrogen | wt %-dry | 0.4 | 0.3 | 0.4 | 0.4 | 0.3 | 0.2 | 0.4 |
| | combustible sulfur | wt %-dry | 0.00 | 0.01 | 0.01 | 0.01 | 0.00 | 0.00 | 0.00 |
| | O/C | mol/mol | 0.63 | 0.59 | 0.56 | 0.50 | 0.48 | 0.42 | 0.35 |
| | H/C | mol/mol | 1.30 | 1.29 | 1.28 | 1.18 | 1.13 | 1.04 | 0.98 |
| total sulfur | | wt %-dry | 0.01 | 0.01 | 0.02 | 0.02 | 0.01 | 0.01 | 0.01 |
| non-combustible sulfur | | wt %-dry | 0.01 | 0.00 | 0.01 | 0.01 | 0.01 | 0.01 | 0.01 |
| bulk density | | g/cm$^3$ | 0.69 | 0.69 | 0.66 | 0.63 | 0.63 | 0.59 | 0.55 |
| bulk density ratio (B/A) | | — | — | 1.00 | 0.96 | 0.91 | 0.91 | 0.86 | 0.80 |
| HGI | | | — | 21 | 24 | 29 | 38 | 35 | 38 | 46 |
| ratio of HGI (H2/H1) | | | — | — | 1.14 | 1.38 | 1.81 | 1.67 | 1.81 | 2.19 |

Further analyses were carried out as described below to the biomass solid fuels obtained in the above Examples and Comparative Examples.

[COD]

FIG. 1 shows the correlations of the heating temperature in the heating step and COD (chemical oxygen demand) and pH (pH is described below) in the immersion water when the resulting biomass solid fuels were immersed in water. A sample of immersion water for COD determination was prepared in accordance with Japan Environment Agency Announcement No. 13 "(A) a method for detecting a metal or the like contained in an industrial waste", 1973, and COD was analyzed in accordance with JIS K0102(2010)-17.

From FIG. 1, COD of Comparative Example A (WP: biomass solid fuel obtained by only molding without heating step) is high, i.e. approximately 1200 ppm. In contrast, COD values of the biomass solid fuels that have been heated at 230° C. or higher are less 800 ppm, indicating that the elution of tar component is low. Accordingly, it is shown that the biomass solid fuels of Example A-1 to A-6 are fuels having excellent handling properties because the elution of tar component is low even during outdoor storage. The COD values of the biomass solid fuels of Examples A-1 to A-6 heated at 230° C. or higher decrease as the heating temperature becomes higher. This is presumed that the COD value decreases by volatilization of tar or the like due to heating. Therefore, even in the case where the heating temperature is lower than 230° C., namely the heating temperature is 150° C. or higher and lower than 230° C., lower COD values is expected in comparison with the values of Comparative Example A.

[PH]

Solid fuels of Examples A-1 to A-6 and Comparative Example A were immersed in water at solid-liquid ratio of 1:3, and pH values were measured. FIG. 1 shows that although slightly low values are observed for Example A-2 and Example A-3, pH values are approximately about 6 in all of Examples A-1 to A-6, indicating that there is no particular change as compared with unheated Comparative Example A. Therefore, it is shown that no particular problem occurs concerning pH values of the discharged water when Examples A-1 to A-6 are stored outdoor.

[Grindability]

Figure 2:
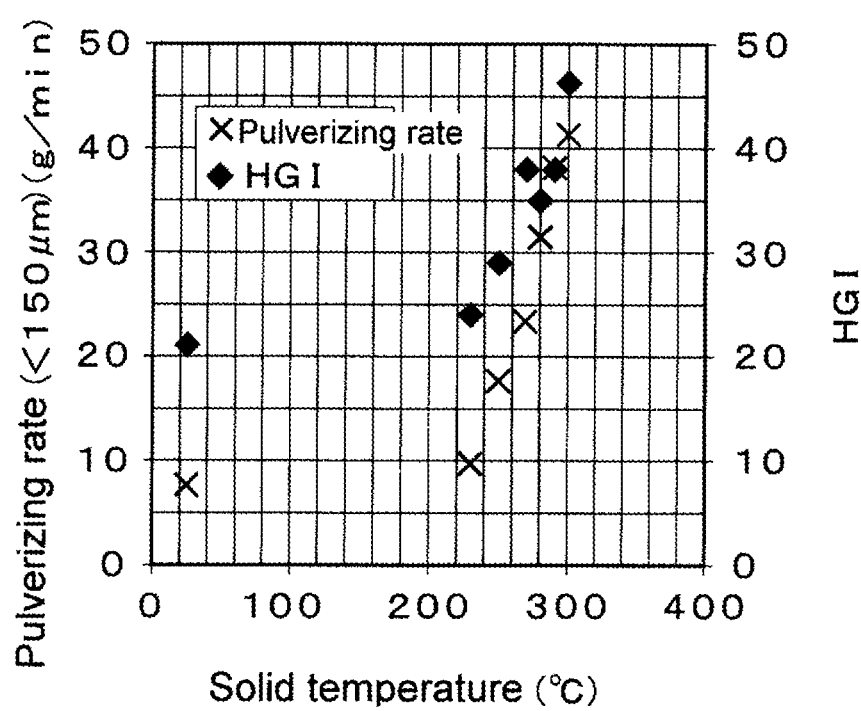
FIG. 2 is a graph showing the correlation of the temperature of the heating step to grindability index and pulverizing rate of the obtained biomass solid fuels.

FIG. 2 shows a relationship between heating temperature in the heating step and Hradgrove grindability Index (HGI) and pulverizing rate (described later) of the obtained biomass solid fuel A, for the biomass solid fuels in Comparative Example A and Examples A-1 to A-6.

As clearly seen from Table 1 and FIG. 2, properties were altered by heating in Examples A-1 to A-6, and HGI values (based on JIS M 8801) were higher than that of Comparative Examples A (WP: unheated biomass solid fuel after molding). A typical HGI value for coal (bituminous coal) is around 50, and pulverizing properties of Examples A-1 to A-6 are closer to coal and better than Comparative Example A.

The pulverizing rate in FIG. 2 is a ground weight per a unit time (g/min) as determined by measuring the weight of a ground sample which is a fraction passing through a 150 μm sieve after pulverizing a sample of 700 cc with a ball mill. Herein, measuring was carried out by using a ball mill conforming to JIS M4002, wherein into a cylindrical container having an inner diameter of 305 mm×axial length of 305 mm, normal grade ball bearings as defined in JIS B1501 (Φ36.5 mm×43 balls, Φ30.2 mm×67 balls, Φ24.4 mm×10 balls, Φ19.1 mm×71 balls and Φ15.9 mm×94 balls) were charged and the container was rotated at a speed of 70 rpm. Heating improves the pulverizing rate, in particular, heating at 230° C. or higher considerably increases the pulverizing rate. It can be considered that elution and solidification associated with heating of organic ingredients such as tar leads to an increase in hardness of the biomass solid fuel and improvement of pulverizing efficiency. Therefore, even in the case where the heating temperature is 150° C. or higher and lower than 230° C., improved HGI and pulverizing rate are expected in comparison with the values of unheated Comparative Example A.

[Disintegration Test]

Figure 3:
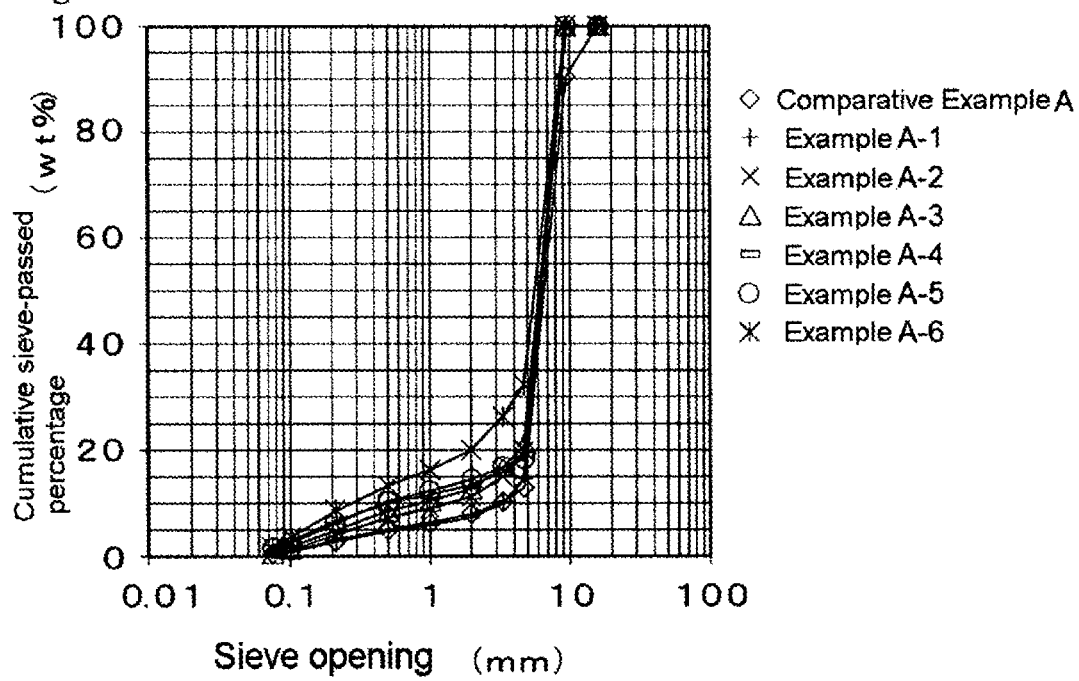
FIG. 3 is a graph showing a particle size distribution of the biomass solid fuels subjected to disintegration test.

Table 2 shows cumulative sieve-passed percentage of the biomass solid fuel A after subjected to the disintegration test, and FIG. 3 is a particle size distribution diagram. In order to evaluate the handling characteristics of the pellets, disintegration test was performed. 1 kg of sample was packed into a plastic bag and was dropped 20 times from a height of 8.6 m, and subjected to rotational strength test based on JIS Z 8841, to measure the particle size distribution. The resulting particle size distribution is shown in FIG. 3. Herein, a sample having a particle size distribution in which an amount of 2 mm sieve-passed particles is 30 wt % or less and an amount of 0.5 mm sieve-passed particles is 15 wt % or less, is determined as a sample having a handleable particle size in storage and the like. The results of Table 2 and FIG. 3 show that while the sample particle size after rotation strength test has become finer as the heating temperature becomes higher, all samples clear the evaluation criteria described above and therefore they are handleable without any problem.

TABLE 2

| Sieve opening (mm) | Comparative Example A (wt %) | Example A-1 (wt %) | A-2 (wt %) | A-3 (wt %) | A-4 (wt %) | A-5 (wt %) | A-6 (wt %) |
|---|---|---|---|---|---|---|---|
| 16 | 100.0 | 100.0 | 100.0 | 100.0 | 100.0 | 100.0 | 100.0 |
| 9.5 | 90.5 | 100.0 | 100.0 | 100.0 | 100.0 | 100.0 | 100.0 |
| 4.75 | 12.9 | 14.4 | 19.5 | 20.9 | 32.3 | 19.1 | 18.4 |
| 3.35 | 10.2 | 10.1 | 14.9 | 16.9 | 26.2 | 15.8 | 16.8 |
| 2 | 8.0 | 7.4 | 11.2 | 12.7 | 20.0 | 13.4 | 14.5 |
| 1 | 6.3 | 5.8 | 9.0 | 10.4 | 16.1 | 11.6 | 12.3 |
| 0.5 | 5.1 | 4.7 | 7.2 | 8.6 | 13.2 | 10.0 | 10.3 |
| 0.212 | 3.0 | 2.8 | 4.0 | 4.9 | 8.6 | 6.8 | 6.3 |
| 0.1 | 1.2 | 1.0 | 1.2 | 1.7 | 3.5 | 2.7 | 2.4 |
| 0.075 | 0.7 | 0.6 | 0.6 | 0.8 | 1.7 | 1.5 | 1.3 |

[Immersion in Water]

Figure 4:
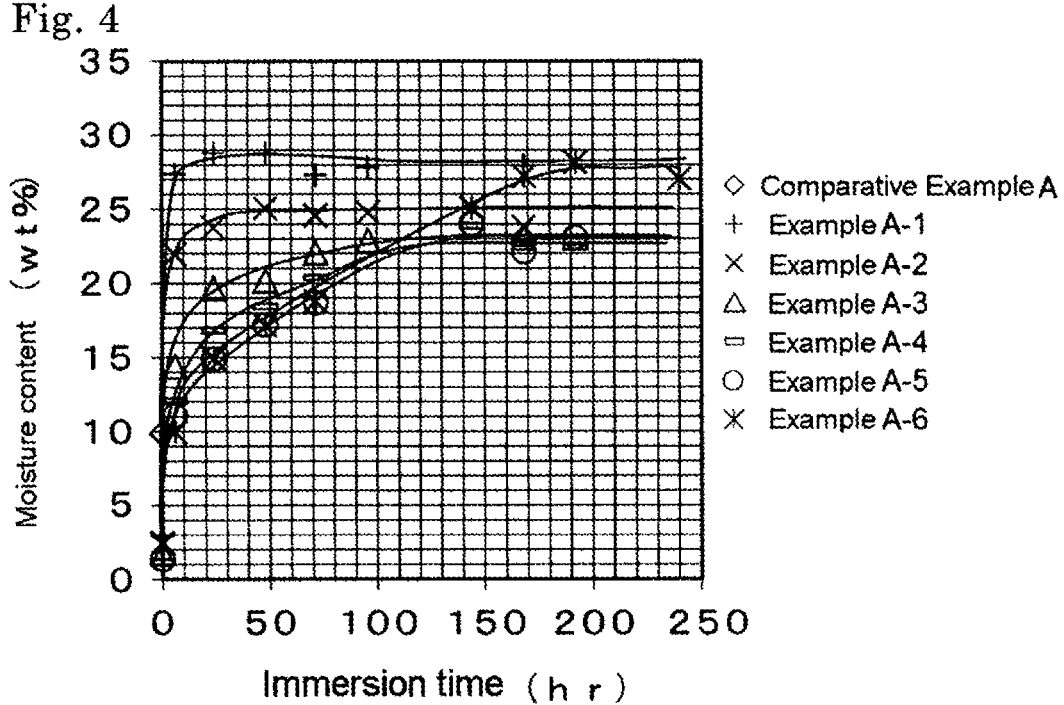
FIG. 4 is a graph showing the results of a water immersion test (moisture content of the solid) of biomass solid fuels.

Table 3 and FIG. 4 show the results of a water immersion test of biomass solid fuels A. Solid fuels from respective Examples and Comparative Example were immersed in water and removed after a predetermined time shown in Table 3 and FIG. 4. After wiping off water, a moisture content of the solid was measured. The solid fuel of Comparative Example A (WP) was disintegrated by immersion in water, and the measurement of moisture content of the solid was impossible. In contrast, in the solid fuel of Example A-1, the moisture content reached equilibrium in about 10 hours after immersion, and the equilibrium moisture content was about 27 wt %. In the solid fuel of Example A-2, the moisture content reached the equilibrium after about 100 hours, and equilibrium moisture content was about 25 wt %. Also, in the solid fuels of Examples A-3 to A-5, the moisture content reached the equilibrium of about 23 wt % after about 100 hours. Also, in the solid fuel of Example A-6, the moisture content reached nearly equilibrium after about 100 hours, and the equilibrium moisture content was about 28 wt % (although the variance is larger than that of Examples A-3 to A-5, it is believed to be due to variations in raw materials). It can be considered that these results were obtained because elution and solidification of organic ingredients such as tar associated with heating made the surface of the biomass solid fuel hydrophobic, indicating that Examples A-1 to A-6 (PBT) have advantageous properties as a solid fuel which is often stored outdoors.

TABLE 3

| | | Immersion time (h) | | | | | | | | |
|---|---|---|---|---|---|---|---|---|---|---|
| | | 0 | 6 | 24 | 48 | 72 | 96 | 144 | 168 | 192 | 240 |
| Moisture content after immersion (wt %) | Ex. A-1 | 2.83 | 27.34 | 28.76 | 28.81 | 27.35 | 27.79 | | 27.97 | | |
| | Ex. A-2 | 2.37 | 21.91 | 23.74 | 25.02 | 24.59 | 24.71 | | 23.80 | | |
| | Ex. A-3 | 1.71 | 14.39 | 19.66 | 20.30 | 22.09 | 22.85 | | 23.00 | | |
| | Ex. A-4 | 1.13 | 12.00 | 16.78 | 18.43 | 20.31 | | 23.83 | 22.58 | 22.41 | |
| | Ex. A-5 | 1.31 | 11.10 | 14.87 | 17.16 | 18.67 | | 23.93 | 22.09 | 23.04 | |
| | Ex. A-6 | 2.48 | 9.99 | 14.94 | 17.05 | 18.73 | | 25.02 | 27.21 | 28.13 | 26.97 |

Ex. = Example

[Solid Strength Before and after Immersion in Water]
(Rotational Strength)

Figure 5:
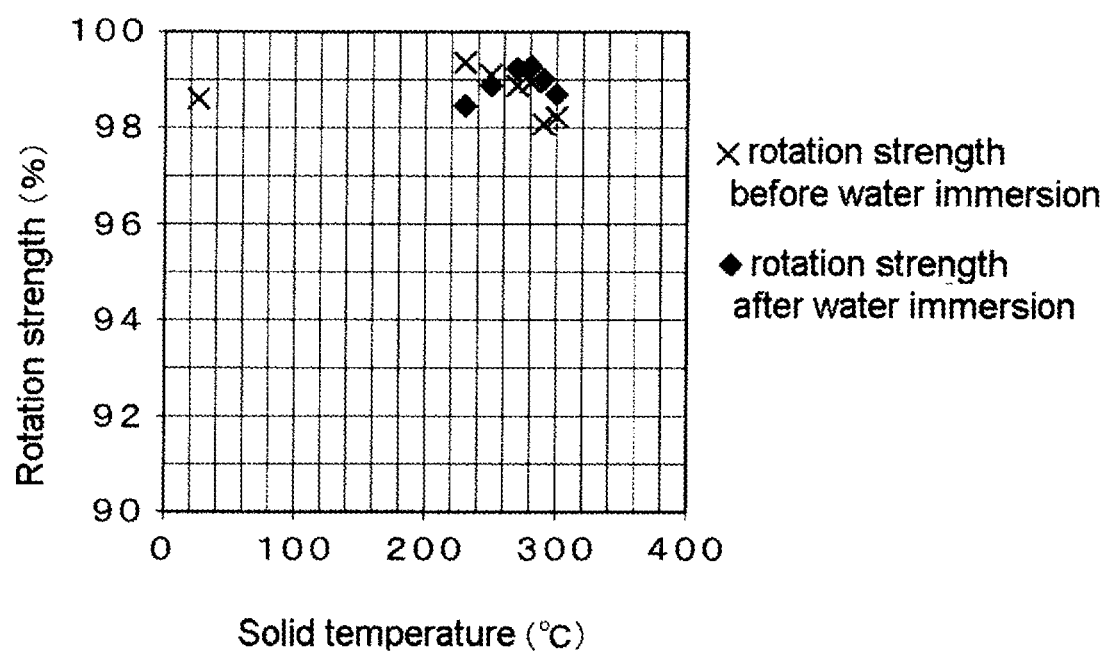
FIG. 5 is a graph showing the solid strength (rotation strength) before and after a water immersion test.

FIG. 5 shows the results of solid strength measured before and after the immersion in water (based on JIS Z-8841 rotational strength test method) for Examples A-1 to A-6 and Comparative Example A. As mentioned above, the solid fuel of Comparative Example A (WP) was disintegrated by immersion in water, and the measurement of rotational strength after immersion was impossible. For Examples A-1 to A-6 (PBT), samples used are those dried for 22 hours at 35° C. in a thermostat oven, after wiping off water on the surface of the solid fuels that have reached the equilibrium moisture content. In Examples A-1 to A-6 (PBT) that have experienced the heating step, the strength did not substantially decrease, and powdering hardly occurred even compared with Comparative Example A before water immersion (WP), and thus it can be said that the handleability is maintained.

(Mechanical Durability)

Figure 6:
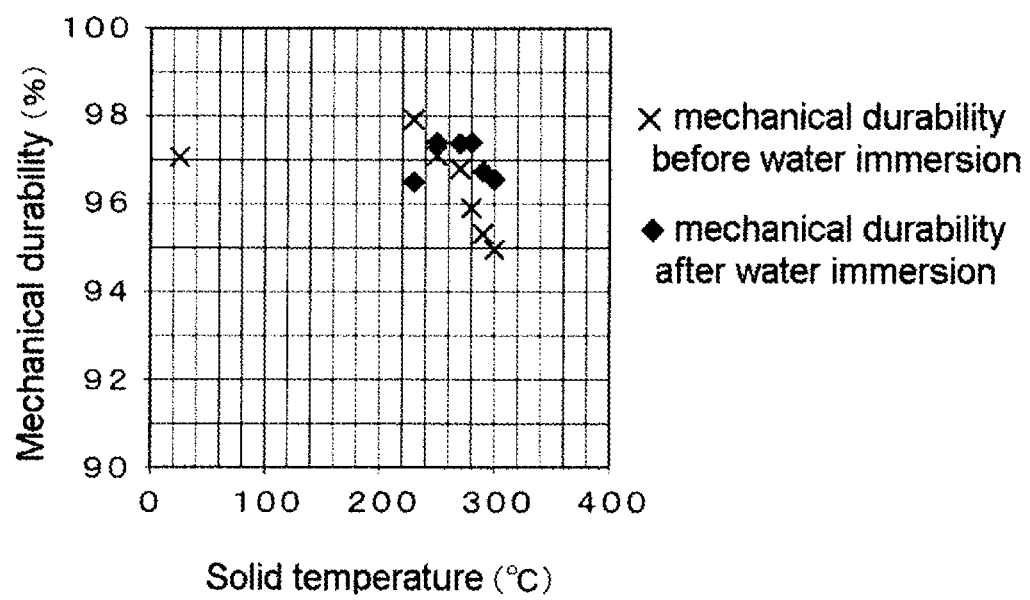
FIG. 6 is a graph showing the solid strength (mechanical durability) before and after a water immersion test.

FIG. 6 is a diagram showing the result measured for the mechanical durability before and after immersion in water. For solid fuels of Examples A-1 to A-6 and Comparative Example A, mechanical durability DU was determined based on the following equation in accordance with the United States agriculture industry's standard ASAE S 269.4 and German Industrial Standard DIN EN 15210-1. In the equation, m0 is a sample weight before rotation treatment, m1 is a sieve-on weight of sample after the rotation treatment, wherein the sieve used was a plate sieve having circle holes with 3.15 mm diameter.

$$DU=(m1/m0)\times 100$$

With respect to the mechanical durability, as similar to the rotation strength, in Examples A-1 to A-6 (PBT) that have experienced the heating step, the strength did not substantially decrease, and powdering hardly occurred even compared with Comparative Example A before water immersion (WP), and thus it is indicated that the handleability was maintained.

[Spontaneous Combustion Property]

Spontaneous combustion property was evaluated based on "Spontaneous combustion test" in "the Manual of Tests and Criteria, the United Nations: Regulations for the Carriage and Storage of Dangerous Goods by Ship, 16th revised edition". 1 to 2 cm$^3$ of the biomass solid fuel of Example A-2 (heating temperature: 250° C.) was dropped to an inorganic insulation board from a height of 1 m, and determined whether ignition during falling or within five minutes after falling occurs. The test was made six times. Since the ignition did not occur in 6 trials, Example A-2 (PBT) was determined that it does not fall to the packing grade I of the above UN Manual of Tests and Criteria.

[Self Heating Property]

Self heating property was evaluated based on "Self combustion test" in "Regulations for the Carriage and Storage of Dangerous Goods by Ship, 16th revised edition". Into a sample container (stainless steel mesh cube with a side length of 10 cm), the biomass solid fuel of Example A-2 (heating temperature 250° C.) was charged and was suspended inside of a thermostat oven at a temperature of 140° C., and the temperature of the material was measured for 24 hours continuously. Material for which ignition or temperature rise more than 200 degrees is found is determined as a self heating material, and is further subjected to a same test using a sample container with a side length of 2.5 cm and confirmed whether ignition or temperature rise more than 60 degrees occurs. Based on the test results, Example A-2 (PBT) was determined that it does not fall to a self heating material.

[Pore Size Distribution]
(BET Specific Surface Area)

Figure 7:
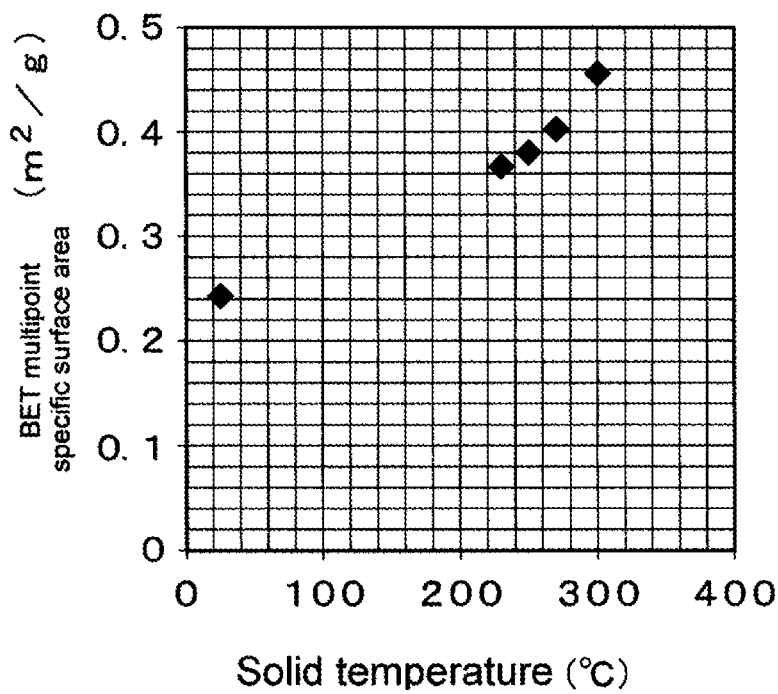
FIG. 7 is a graph showing BET specific surface area of the solid fuels.

FIG. 7 is a diagram showing the results of measurement of BET specific surface area of the solid fuel the A. BET specific surface area was determined using an automatic specific surface area/pore size distribution measuring apparatus (Nippon Bell Co., Ltd. BELSORP-min II) for samples of solid fuels of Examples A-1 to A-6 and Comparative Example A that had been cut into a size of 2 to 6 mm, filled in a container, and degassed in vacuo for 2 hours at 100° C. as a pretreatment. Nitrogen gas was used as an adsorption gas. From FIG. 7, BET specific surface area increases with the increase of heating temperature, showing that pores developed with heating (pyrolysis).

(Average Pore Diameter, Total Pore Volume)

Figure 8:
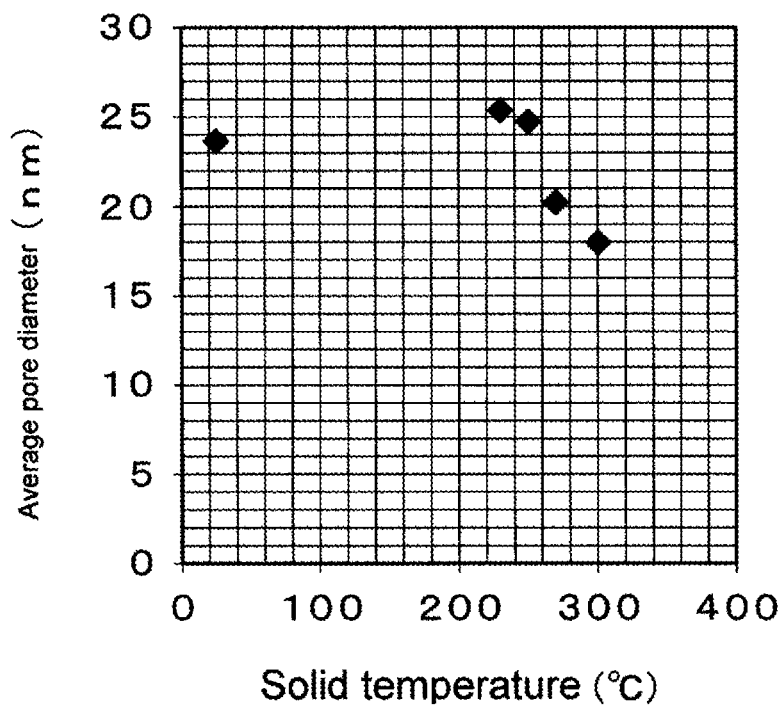
FIG. 8 is a graph showing an average pore diameter of the surface of the solid fuels.
Figure 9:
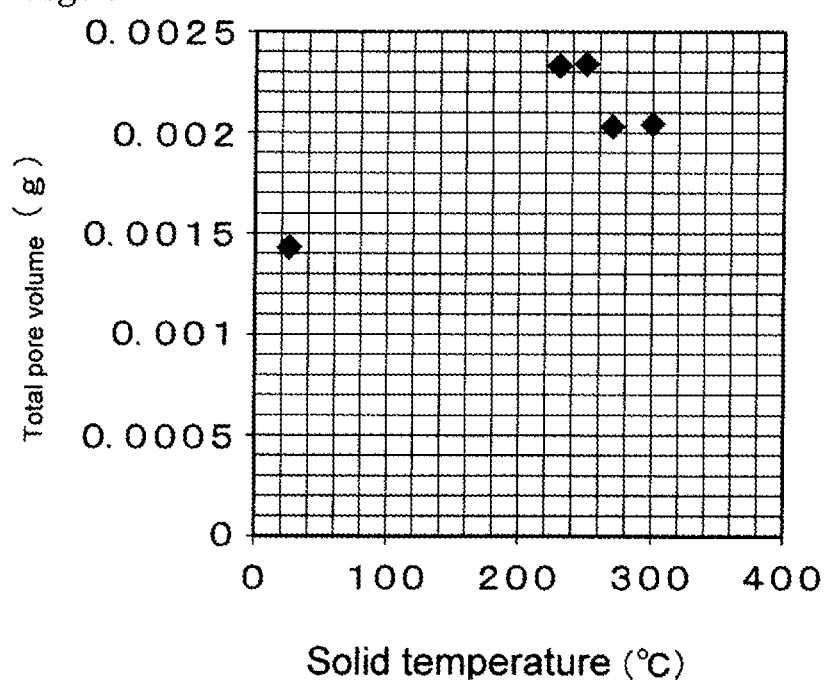
FIG. 9 is a graph showing a total pore volume of the surface of the solid fuels.

FIG. 8 is a diagram showing the average pore diameter at surface of solid fuel A, and FIG. 9 is a diagram showing the total pore volume. Average pore diameter and total pore volume were measured using the same equipment used for BET specific surface area. The term "pore" used herein means cavity having a diameter of 2 nm to 100 nm. The average pore diameter becomes smaller with the increase in heating temperature as in Example A-2 and subsequent Examples, indicating that a large number of finer pores were generated. This is believed to be due to decomposition of cellulose.

[Yield]

Figure 10:
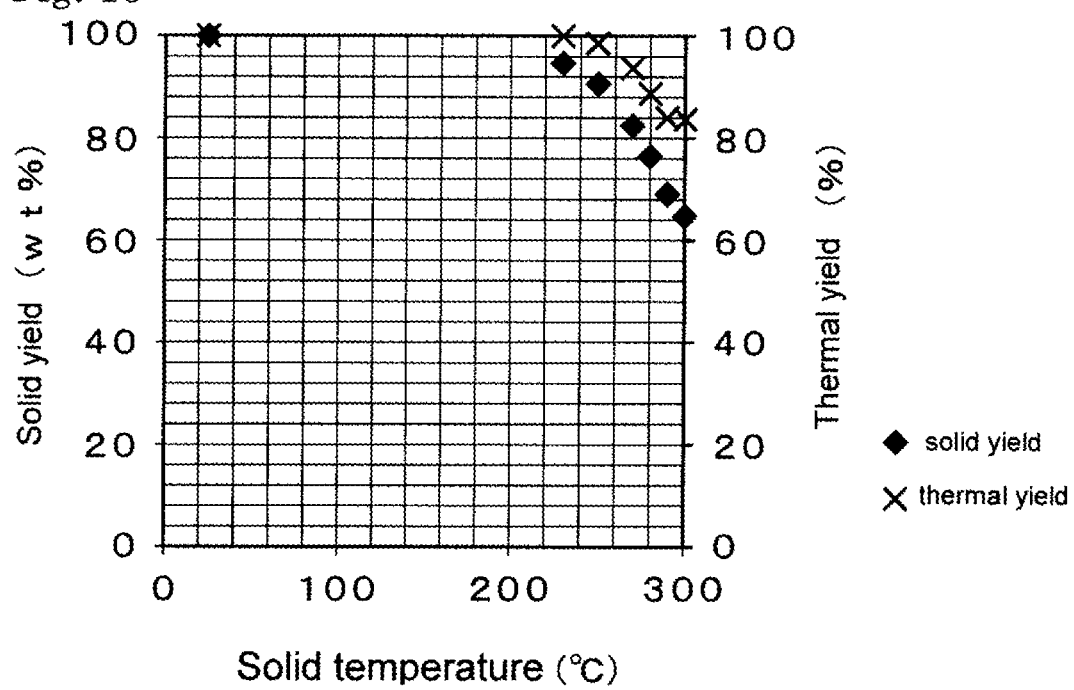
FIG. 10 is a graph showing a yield of the biomass solid fuels.

FIG. 10 is a diagram showing a yield of biomass solid fuel A after the heating step (solid yield and thermal yield). Solid yield is a weight ratio before and after heating, and thermal yield is ratio of heating value before and after heating. As mentioned above, temperature was not maintained at the target temperature (heating temperature) in each Example (this also applies to the following Examples B to K).

From the results of Examples A-1 to A-6, it is shown that according to the present invention, the biomass solid fuel A (PBT) can be obtained with low cost, in which COD reduction, improvement in grindability, reduction of water absorption, improvement in solid strength and improvement in yield have been achieved.

[Spontaneous Combustion Property]

Spontaneous combustion property of the solid fuel of Example A-2 was measured according to the following method. 1 kg of samples was charged in a container, and placed in a thermostat oven at 80° C. Air was flowed to the sample, and the concentrations of O2, CO, and CO2 in the resulting gas was measured. Amount of O2 adsorption, amount of CO formation, amount of CO2 formation by heating samples are calculated from the concentration before and after heating, based on the following equation (1) to calculate the self-heating index (SCI).

Spontaneous combustion index (SCI)={amount of O2 adsorption×heat of O2 adsorption×(1/100)}+{amount of CO formation×(heat of CO formation+(½)×heat of H2O formation×H/C)×(1/100)}+{amount of CO2 formation×(heat of CO2 formation+(½)×heat of H2O formation× H/C)×(1/100)}  formula (1)

Amount of adsorption, amount of formation, and H/C of the solid fuel of Example A-2 are as follows.

Amount of O2 adsorption 0.42 [ml/kg·min]
Amount of CO formation 0.03 [ml/kg·min]
Amount of CO2 formation 0.02 [ml/kg·min]

H/C (molar ratio of hydrogen and carbon in the solid fuel of Example A-2) 1.28 [mol/mol] (see Table 1)

Further, heat of adsorption and respective heat of formation used in equation (1) are as follows.

heat of O2 adsorption 253 [kJ/mol] (same value as heat of O2 adsorption to coal)
heat of CO formation 110.5 [kJ/mol]
heat of H2O formation 285.83 [kJ/mol]
heat of CO2 formation 393.5 [kJ/mol]

SCI of the solid fuel of Example A-2 was calculated based on the above, and SCI=1.3 was found. Herein, since the properties of the biomass solid fuel A of the present invention are close to coal, the same value as the heat of adsorption on coal was used as the heat of O2 adsorption.

Figure 11:
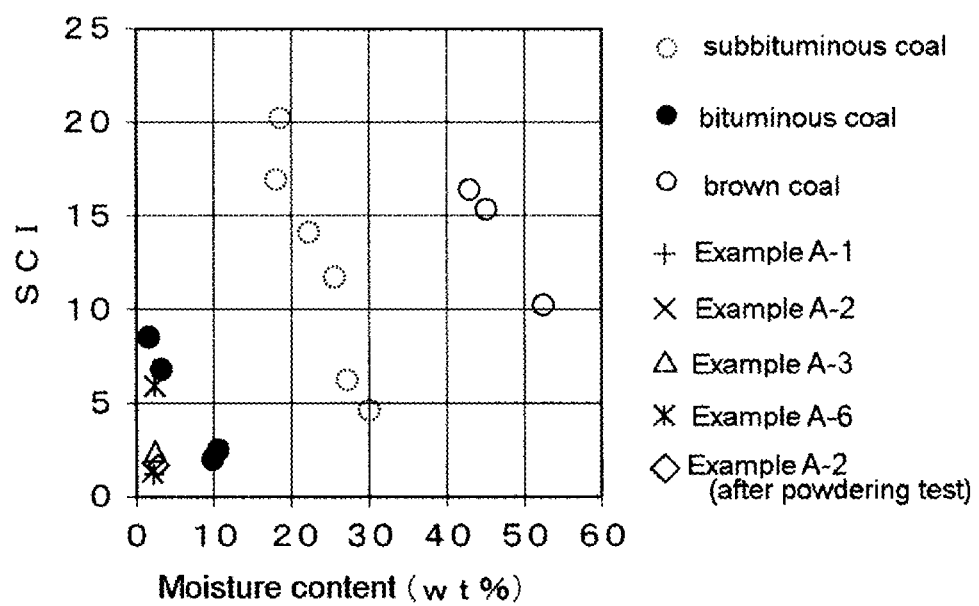
FIG. 11 is a graph showing a spontaneous combustion index (SCI) of the biomass solid fuels.

Using the same method as used for calculation of SCI in Example A-2, SCI of Examples A-1 to A-3, A-6 and SCI of Example A-2 after disintegration test (see Table 2, FIG. 3) was calculated. The calculation results are shown in FIG. 11. For comparison, SCI of bituminous coal in Table 4 is also shown in FIG. 11. The horizontal axis of FIG. 11 is moisture content of arrival-basis, and SCI values of bituminous coal in FIG. 11 are calculated for four samples which are prepared by adding water to the bituminous coal shown in Table 4 to provide four samples with different moisture content.

The lower value of the SCI indicates lower spontaneous combustion property as shown by formula (1). Therefore, when Examples A-1 to A-3, A-6, Example A-2 after disintegration test (see, Table 2 and FIG. 3), and bituminous coal are compared, if the moisture content is comparable, the biomass solid fuels (PBT) of the present invention have lower SCI (spontaneous combustion index) than bituminous coal and thus have the same level of SCI (spontaneous combustion index) as of bituminous coal having high moisture content. Accordingly, the biomass solid fuel A (PBT) of the present invention can be said to be good fuel having a reduced risk of ignition during handling.

TABLE 4

|  |  |  | bituminous coal |
|---|---|---|---|
| proximate analysis | moisture content | wt % (air dried basis) | 3.3 |
|  | ash content |  | 12.3 |
|  | volatile matter |  | 30.5 |
|  | fixed carbon |  | 53.9 |
| higher heating value |  | kcal/kg (dry basis) | 7135 |
| ultimate analysis | ash content | wt % (dry basis) | 12.8 |
|  | carbon |  | 73.6 |
|  | hydrogen |  | 4.5 |
|  | oxygen |  | 6.9 |
|  | nitrogen |  | 1.7 |
|  | combustible sulfur |  | 0.46 |

[Surface Photograph]

Figure 12:
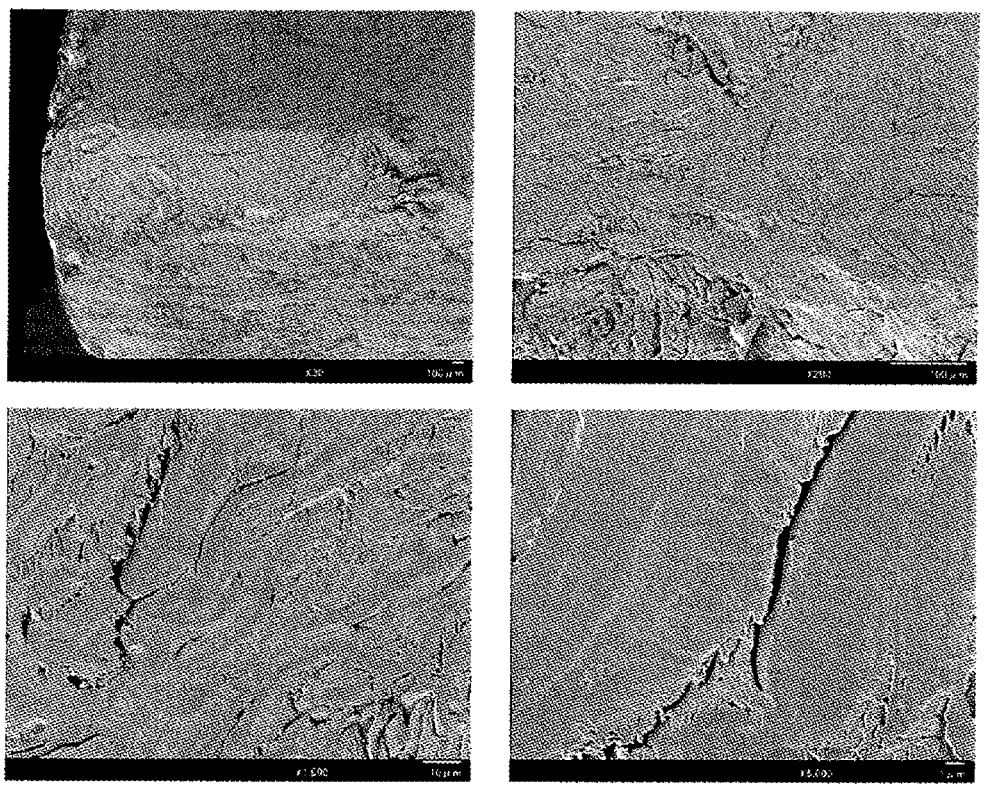
FIG. 12 is a cross-sectional photograph before immersion in water of Example A-2.
Figure 13:
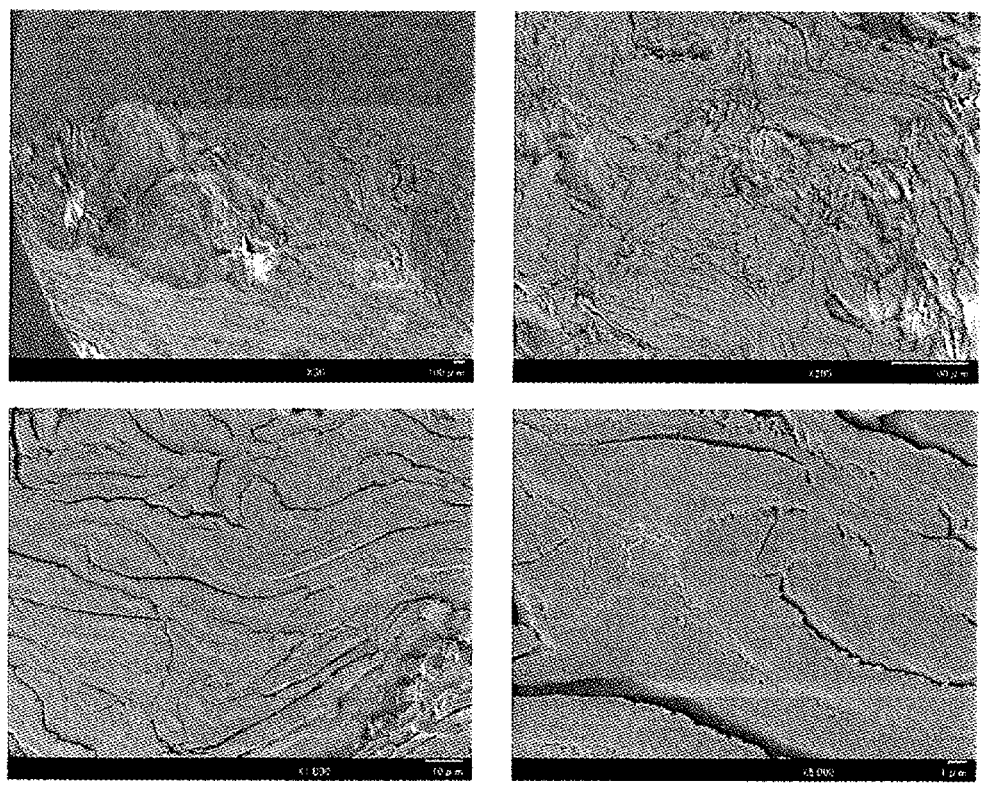
FIG. 13 is a cross-sectional photograph after immersion in water (2 seconds) of Example A-2.
Figure 14:
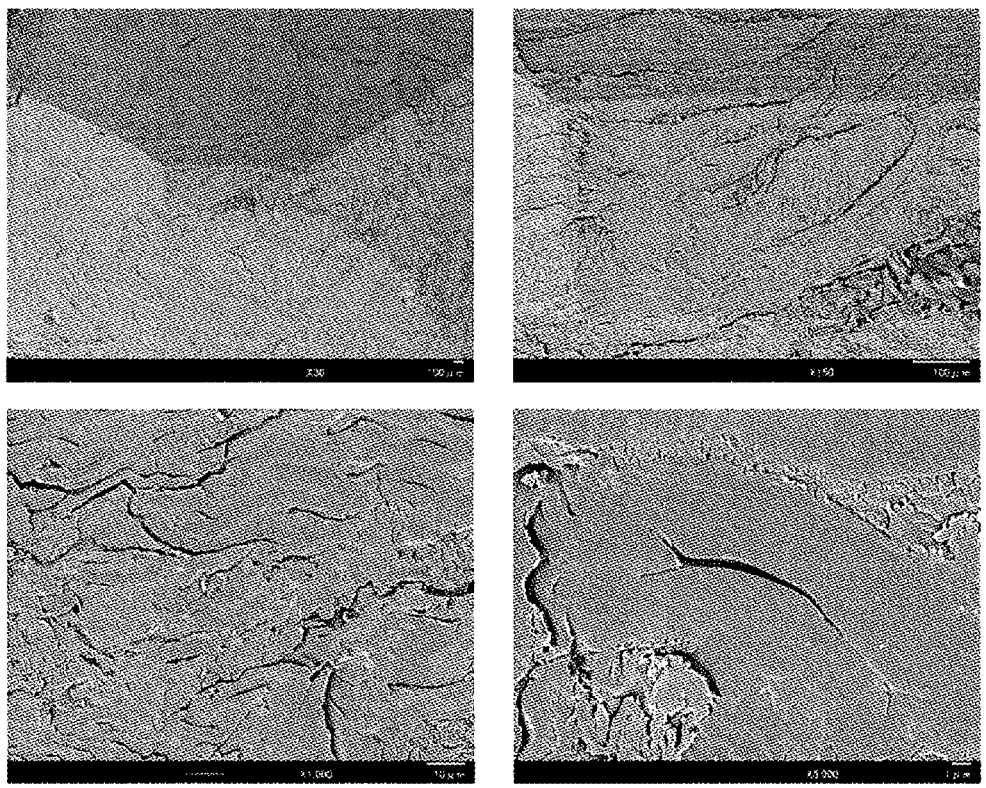
FIG. 14 is a cross-sectional photograph after immersion in water (20 seconds) of Example A-2.
Figure 15:
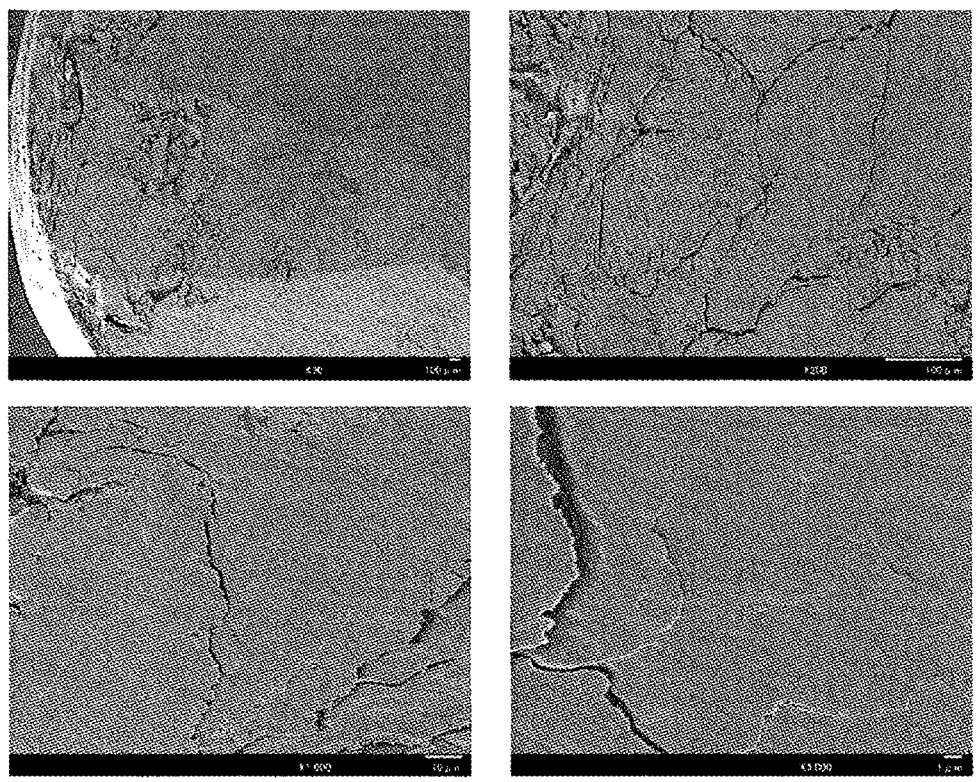
FIG. 15 is a cross-sectional photograph before immersion in water of Comparative Example A.
Figure 16:
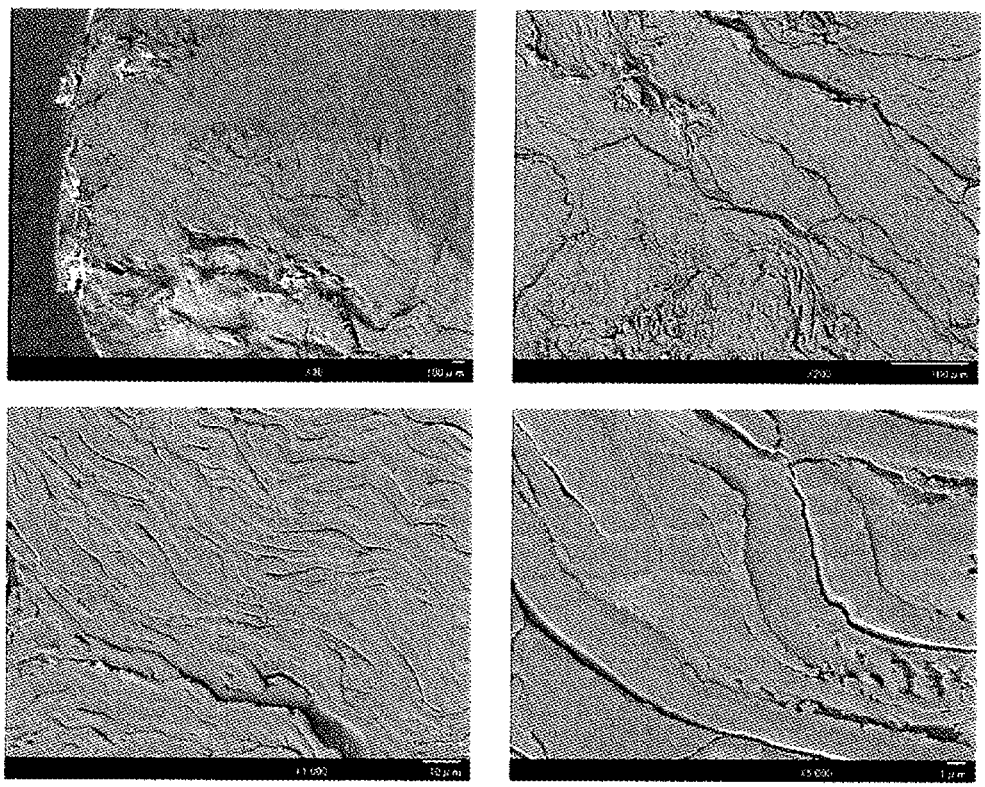
FIG. 16 is a cross-sectional photograph after immersion in water (2 seconds) of Comparative Example A.
Figure 17:
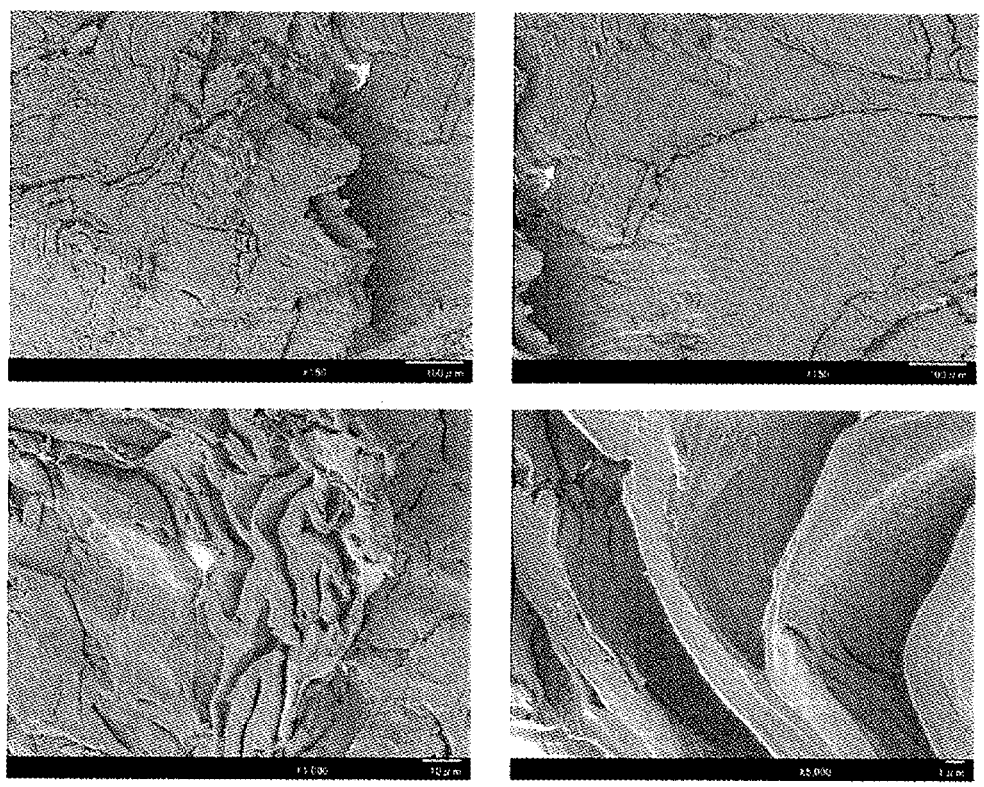
FIG. 17 is a cross-sectional photograph after immersion in water (20 seconds) of Comparative Example A.

FIGS. 12 to 14 are cross-sectional SEM photographs of the solid fuels of Example A-2 (PBT) before and after immersion in water. FIG. 12 is a photograph before immersion, FIG. 13 is a photograph at 2 seconds after immersion, and FIG. 14 is a photograph at 20 seconds after immersion. Similarly, FIGS. 15 to 17 are cross-sectional SEM photographs of the solid fuels of Comparative Example A (WP) before and after immersion in water. FIG. 15 is a photograph before immersion, FIG. 16 is a photograph at 2 seconds after immersion, and FIG. 17 is a photograph at 20 seconds after immersion. In Example A-2 and Comparative Example A, a cross-section after immersion means a cross section obtained by cutting the solid fuel after 2 seconds or 20 seconds after immersion. In addition, the magnification and scale are each shown at bottom part of photographs.

When the photographs before and after immersion in water are compared, pores are enlarged after the water immersion in Comparative Example A (FIGS. 15 to 17). It is presumed that since Comparative Example A (WP) is a molded product of ground biomass, the biomass absorbed water by immersion whereby enlarging pores (gaps between pulverized biomass particles). Thus, it is considered that water further enters the enlarged pores to separate the ground biomasses from each other, causing disintegration of the solid fuel itself (see, FIG. 4).

In contrast, in the surface of solid fuel of Example A-2 (FIGS. 12 to 14), pores did not expand so much even after immersion in water, and the change by immersion was small. It is presumed that in Example A-2, solid cross-linking developed between pulverized biomass particles by heating, and the water absorption has become difficult due to improved hydrophobicity, causing little change by immersion. Therefore, because the bonding or adhesion between biomass that have been crushed is maintained by solid cross-linking even after immersion, disintegration as in Comparative Example A is less likely to take place. Therefore, in the heated solid fuels of Examples A-1 to A-6 (PBT), as shown in FIG. 4, biomass solid fuels were obtained in which disintegration was reduced when exposed to rain water and the like, and handling properties during outdoor storage was ensured.

Example B

In Examples B-1 to B-4 (PBT), except for using European red pine as a biomass raw material, the biomass raw material was heated to target temperatures (heating temperatures described in Table 5) in the same manner as Example A. Table 5 and Table 6 show the properties of the resulting biomass solid fuel B (Examples B-1 to B-4) obtained after the heating step. Similarly, the properties of Comparative Example B (WP) is also shown. A binder is not used in Examples B-1 to B-4 and Comparative Example B, as is in Example A. Since the moisture contents after immersion in water are those after immersing more than 100 hours (168 hours in Example B), the moisture content in the solid fuel B is considered to have reached equilibrium. Methods of measuring properties of the biomass solid fuel are the same as that described in the above Example A. A ball mill grindability described in Table 6 was measured as follows.

[Ball Mill Grindability]

The pulverizing time of each biomass solid fuel B was 20 minutes, and 150 µm sieve-passed weight ratio after 20 minutes was determined as pulverizing point. Herein, measuring was carried out by using a ball mill conforming to JIS M4002, wherein into a cylindrical container having an inner diameter of 305 mm×axial length of 305 mm, normal grade ball bearings as defined in JIS B1501 (Φ36.5 mm×43 balls, Φ30.2 mm×67 balls, Φ24.4 mm×10 balls, Φ19.1 mm×71 balls and Φ15.9 mm×94 balls) was charged and the container was rotated at a speed of 70 rpm. The higher value indicates that the grindability is improved. It was confirmed that with the increase in the heating temperature, pulverizing point increased.

Comparative Example B disintegrated immediately after immersion in water. In contrast, in Examples B-1, B-3 and B-4, the bonding or adhesion between pulverized biomass particles are maintained even after immersion in water (168 hours), and they did not disintegrate. Thus, since solid forms were maintained even after immersion, measurement of moisture content was possible, and thus the generation of water resistance was confirmed. Further, the grindability is improved compared with Comparative Example B, and also COD is reduced. From the viewpoint of water resistance (moisture content after immersion), the biomass solid fuel of Example B-3 is particularly excellent, and from the viewpoint of yield, the biomass solid fuels of Examples B-2 and B-3 showed particularly excellent physical properties.

In addition, it is presumed that Example B-2 has excellent water resistance and grindability based on the development of solid cross-linking, and is a fuel exhibiting reduced COD.

Example C

Except for using almond old tree as a biomass raw material, the biomass raw material was heated to target temperatures (heating temperatures described in Table 5) in the same manner as Example A (Examples C-1 to C-4: PBT). The ball mill grindability was measured in the same manner as in the above example B. Table 5 and Table 6 show the properties of the resulting biomass solid fuel C obtained after the heating step. Similar to Example B, since the moisture contents after immersion in water are those after immersing more than 100 hours (168 hours in Example C), the moisture content is considered to have reached equilibrium. Similarly, the properties of Comparative Example C (WP) is also shown. A binder is not used in Examples C-1 to C-4 and Comparative Example C.

Comparative Example C disintegrated immediately after immersion in water. In contrast, in Examples C-1 to C-4, the bonding or adhesion between pulverized biomass particles were maintained even after immersion in water, and they did not disintegrate, indicating that water resistance is improved. In addition, improvement of grindability and reduction of COD are indicated. From the viewpoints of COD and water resistance (moisture content after immersion), Examples C-2, C-3 and C-4 are excellent, and from the viewpoint of thermal yield, Examples C-1, C-2 and C-3 are excellent. Herein, although HGI of Example C-1 is lower than that of Comparative Example C, this is believed to be due to variations in raw materials and measurement errors, and therefore, Example C-1 is presumed to have HGI value equal to or more than at least Comparative Example C.

Example D

Except for using a mixture of (30 wt % of almond shell+70 wt % of almond old tree) as a biomass raw material, the biomass raw material was heated to target temperatures (heating temperatures described in Table 5) in the same manner as Example A (Examples D-1 to D-4: PBT). The ball mill grindability was measured in the same manner as in the above example B. Table 5 and Table 6 show the properties of the resulting biomass solid fuel D obtained after the heating step. Since the moisture contents after immersion in water are those after immersing more than 100 hours (168 hours in Example D), the moisture content is considered to have reached equilibrium. Similarly, the properties of Comparative Example D (WP) is also shown. A binder is not used in Examples D-1 to D-4 and Comparative Example D.

Comparative Example D disintegrated immediately after immersion in water. In contrast, in Examples D-1 to D-4, the bonding or adhesion between pulverized biomass particles were maintained even after immersion in water, and they did not disintegrate, indicating that water resistance is improved. In addition, improvement of grindability and reduction of COD are indicated. From the viewpoint of COD, Examples D-2, D-3 and D-4 are excellent, and from the viewpoint of thermal yield, Examples D-1, D-2 and D-3 showed particularly excellent physical properties.

Example E

Except for using acacia xylem part as a biomass raw material and molding it into a tablet shape, and except for using a tubular furnace having φ70 mm as a heating apparatus, the biomass raw material was heated to target temperatures (heating temperatures described in Table 5) in the same manner as Example A (Examples E-1 to E-3: PBT). Table 5 and Table 6 show the properties of the resulting biomass solid fuel E obtained after the heating step. Since the moisture contents after immersion in water are those after immersing more than 100 hours (168 hours in Example E), the moisture content is considered to have reached equilibrium. Similarly, the properties of Comparative Example E (WP) is also shown. A binder is not used in Examples E-1 to E-3 and Comparative Example E. In Example E, measurement of pH was carried out by immersing solid fuels with the solid-liquid ratio of 1:13. Herein, the immersion time of Comparative Example E in Table 6 is a time when pH was measured, namely, it means that pH was measured at 96 hours after the solid fuel of Comparative example E was immersed.

Comparative Example E disintegrated immediately after immersion in water. However, in Examples E-1 to E-3, the bonding or adhesion between pulverized biomass particles are maintained, and they did not disintegrate, showing water resistance. From the viewpoint of water resistance (moisture content after immersion), Examples E-2 and E-3 are excellent, and from the viewpoint of thermal yield, Examples E-1 and E-2 are excellent. In Example E, it is estimated that the solid-cross-linking described above is formed also in PBT heated at 240 to 270° C., and therefore water resistance, COD, and grindability and the like are considered excellent. While thermal yield of Example E-1 exceeds 100%, this was caused by variations in raw materials and measurement errors.

Example F

Except for using acacia bark as a biomass raw material, the biomass raw material is heated to target temperatures (heating temperatures described in Table 5) in the same manner as Example E (Examples F-1 to F-4: PBT). Table 5 and Table 6 show the properties of the resulting biomass solid fuel F obtained after the heating step. Since the moisture contents after immersion in water are those after immersing more than 100 hours (168 hours in Example F), the moisture content is considered to have reached equilibrium. Similarly, the properties of Comparative Example F (WP) is also shown. A binder is not used in Examples F-1 to F-4 and Comparative Example F. In Example F, measurement of pH was carried out by immersing solid fuels with the solid-liquid ratio of 1:13. Herein, the immersion time of Comparative Example F in Table 6 is a time when pH was measured, namely, it means that pH was measured at 96 hours after the solid fuel of Comparative example F was immersed.

Comparative Example F disintegrated one hour after immersion in water. However, in Examples F-1 to F-4, the bonding or adhesion between pulverized biomass particles are maintained, and they did not disintegrate, showing water resistance. From the viewpoints of COD and water resistance (moisture content after immersion), Examples F-2, F-3 and F-4 are excellent, and from the viewpoint of thermal yield, Examples F-1, F-2 and F-3 are excellent.

Example G

Except for using a mixture of (70 wt % of almond shell+30 wt % of walnut shell), as a biomass raw material, and except for using a tubular furnace having φ70 mm as a heating apparatus, the biomass raw material was heated to target temperatures (heating temperatures described in Table 5) in the same manner as Example A (Examples G-1 to G-4: PBT). Table 5 and Table 6 show the properties of the resulting biomass solid fuel G obtained after the heating step. Since the moisture contents after immersion in water are those after immersing more than 100 hours (144 hours in Example G), the moisture content is considered to have reached equilibrium. Similarly, the properties of Comparative Example F (WP) is also shown. A binder is not used in Examples G-1 to G-4 and Comparative Example G.

Comparative Example G disintegrated immediately after immersion in water. However, in Examples G-1 to G-4, the bonding or adhesion between pulverized biomass particles are maintained, and they did not disintegrate, showing water resistance. From the viewpoints of COD and water resistance (moisture content after immersion), Examples G-2, G-3 and G-4 are excellent, and from the viewpoint of thermal yield, Examples G-1, G-2 and G-3 are excellent. While thermal yield of Example G-2 exceeds 100%, this was caused by variations in raw materials and measurement errors.

Example H

Except for using sago palm as a biomass raw material, the biomass raw material is heated to target temperatures (heating temperatures described in Table 5) in the same manner as Example A (Examples H-1 to H-4: PBT). The ball mill grindability was measured in the same manner as in the above example B. Table 5 and Table 6 show the properties of the resulting biomass solid fuel H obtained after the heating step. Since the moisture contents after immersion in water are those after immersing more than 100 hours (168 hours in Example H), the moisture content is considered to have reached equilibrium. Similarly, the properties of Comparative Example H (WP) is also shown. A binder is not used in Examples H-1 to H-4 and Comparative Example H. Herein, the immersion time of Comparative Example H in Table 6 is a time when pH was measured, namely, it means that pH was measured at 24 hours after the solid fuel of Comparative example H was immersed.

Comparative Example H disintegrated three hours after immersion in water. However, in Examples H-1 to H-4, the bonding or adhesion between pulverized biomass particles are maintained, and they did not disintegrate, showing water resistance. From the viewpoints of COD, pH (slightly low) and water resistance (moisture content after immersion), Examples H-2, H-3 and H-4 are excellent, and from the viewpoint of thermal yield, Examples H-1, H-2 and H-3 are excellent.

Example I

Except for using EFB (empty fruit bunch that is residue of palm oil processing) as a biomass raw material, the biomass raw material was heated to target temperatures (heating temperatures described in Table 5) in the same manner as Example A (Examples I-1 to I-4: PBT). Table 5 and Table 6 show the properties of the resulting biomass solid fuel I obtained after the heating step. Since the moisture contents after immersion in water are those after immersing more than 100 hours (168 hours in Example I), the moisture content is considered to have reached equilibrium. Similarly, the properties of Comparative Example I (WP) is also shown. A binder is not used in Examples I-1 to I-4 and Comparative Example I.

The mechanical durability before and after immersion in water for Example I-3 that had been heated at 270° C. and Example I-4 that had been heated at 300° C. was measured by the following method. 50 g of sample was filled in a 1,000 cc container made of polypropylene, and rotated at 60 rpm for 30 minutes (1,800 rotations in total) using Mazemazeman (trade mark) SKH-15DT manufactured by MISUGI LTD. The sample after rotation treatment was sieved by a sieve having a circular hole diameter of 3.15 mm, and mechanical durability (DU) was calculated by the following equation:

$$DU=(m1/m0)\times 100$$

In the equation, m0 is a sample weight before rotation treatment, m1 is a sieve-on weight of sample after the rotation treatment.

Comparative Example I disintegrated immediately after immersion in water. However, in Examples I-1 to I-4, the bonding or adhesion between pulverized biomass particles are maintained, and they did not disintegrate, showing water resistance. From the viewpoints of COD and water resistance (moisture content after immersion), Examples I-2, I-3 and I-4 are excellent, and from the viewpoint of thermal yield, Examples I-1, I-2 and I-3 are excellent.

Example J

Except for using meranti as a biomass raw material, the biomass raw material was heated to target temperatures (heating temperatures described in Table 5) in the same manner as Example A (Examples J-1 and J-2: PBT). Table 5 and Table 6 show the properties of the resulting biomass solid fuel J obtained after the heating step. Since the moisture contents after immersion in water are those after immersing more than 100 hours (168 hours in Example J), the moisture content is considered to have reached equilibrium. Similarly, the properties of Comparative Example J (WP) is also shown. A binder is not used in Examples J-1 and J-2 and Comparative Example J.

Comparative Example J disintegrated immediately after immersion in water. However, in Examples J-1 and J-2, the bonding or adhesion between pulverized biomass particles are maintained, and they did not disintegrate, showing water resistance. Excellent results were obtained also for COD.

Example K

Except for using rubber tree as a biomass raw material, and except for using a tubular furnace having φ70 mm as a heating apparatus, the biomass raw material was heated to target temperatures (heating temperatures described in Table 5) in the same manner as Example A (Example K-1). Table 5 and Table 6 show the properties of the resulting biomass solid fuel K obtained after the heating step. Similarly, the properties of Comparative Example K (WP) is also shown. A binder is not used in Examples and Comparative Example.

Comparative Example K is expected to disintegrate by immersion in water as the other Comparative Examples. On the other hand, it is expected that Example K-1 does not disintegrate even by immersion in water due to the above solid cross-linking, and the improvement of grindability, reduction of COD and the like will be obtained. While Example K-1 was heated at 270° C., the same effect is expected to the heating temperature of 230 to 270° C. in the same manner as described above.

TABLE 5

| | | tree species | heating temp. ° C. | solid yield wt % | thermal yield % | fixed carbon wt % - AD | volatile matter wt % - AD | fuel ratio | HHV kcal/ kg -dry |
|---|---|---|---|---|---|---|---|---|---|
| Comp-Ex. B | WP | European red pine | unheated | 100.0 | 100.0 | 11.5 | 77.4 | 0.15 | 4,949 |
| Ex. B-1 | PBT | | 230 | 94.7 | 98.1 | 12.8 | 78.7 | 0.16 | 5,125 |
| Ex. B-2 | | | 250 | 87.8 | 94.2 | 16.2 | 77.2 | 0.21 | 5,310 |
| Ex. B-3 | | | 270 | 81.4 | 89.2 | 18.3 | 75.7 | 0.24 | 5,425 |
| Ex. B-4 | | | 300 | 52.7 | 70.5 | 44.2 | 50.0 | 0.88 | 6,618 |
| Comp-Ex. C | WP | almond old tree | 25 | 100.0 | 100.0 | 18.4 | 63.8 | 0.29 | 4,539 |
| Ex. C-1 | PBT | | 230 | 90.0 | 96.1 | 21.8 | 64.1 | 0.34 | 4,847 |
| Ex. C-2 | | | 250 | 82.4 | 91.8 | 24.9 | 61.7 | 0.40 | 5,059 |
| Ex. C-3 | | | 270 | 75.6 | 88.2 | 28.8 | 57.7 | 0.50 | 5,295 |
| Ex. C-4 | | | 300 | 59.2 | 77.8 | 39.1 | 47.6 | 0.82 | 5,968 |
| Comp-Ex. D | WP | 30 wt % of almond shell + 70 wt % of almond old tree | unheated | 100.0 | 100.0 | 17.3 | 65.5 | 0.26 | 4,535 |
| Ex. D-1 | PBT | | 230 | 89.5 | 96.2 | 21.9 | 64.4 | 0.34 | 4,875 |
| Ex. D-2 | | | 250 | 81.1 | 92.3 | 25.6 | 61.8 | 0.41 | 5,119 |
| Ex. D-3 | | | 270 | 74.1 | 87.6 | 29.1 | 58.0 | 0.50 | 5,361 |
| Ex. D-4 | | | 300 | 56.0 | 75.9 | 42.8 | 43.7 | 0.98 | 6,143 |
| Comp-Ex. E | WP | acacia xylem | unheated | 100.0 | 100.0 | 12.6 | 76.1 | 0.17 | 4,623 |
| Ex. E-1 | PBT | | 230 | 98.2 | 100.3 | 12.8 | 78.4 | 0.16 | 4,721 |
| Ex. E-2 | | | 270 | 87.8 | 95.1 | 16.0 | 74.8 | 0.21 | 5,005 |
| Ex. E-3 | | | 300 | 78.2 | 90.2 | 21.2 | 70.6 | 0.30 | 5,331 |
| Comp-Ex. F | WP | acacia bark | unheated | 100.0 | 100.0 | 25.6 | 60.3 | 0.42 | 4,994 |
| Ex. F-1 | PBT | | 230 | 93.9 | 99.1 | 27.5 | 60.9 | 0.45 | 5,272 |
| Ex. F-2 | | | 250 | 89.1 | 97.0 | 30.5 | 58.9 | 0.52 | 5,439 |
| Ex. F-3 | | | 270 | 84.5 | 95.3 | 33.5 | 56.7 | 0.59 | 5,635 |
| Ex. F-4 | | | 300 | 77.5 | 90.6 | 36.6 | 53.5 | 0.68 | 5,835 |
| Comp-Ex. G | WP | 70 wt % of almond shell + 30 wt % of walnut shell | unheated | 100.0 | 100.0 | 17.7 | 67.1 | 0.26 | 4,603 |
| Ex. G-1 | PBT | | 230 | 91.0 | 96.2 | 20.0 | 67.4 | 0.30 | 4,867 |
| Ex. G-2 | | | 250 | 86.5 | 101.0 | 27.8 | 61.1 | 0.45 | 5,372 |
| Ex. G-3 | | | 270 | 80.1 | 92.2 | 26.4 | 62.9 | 0.42 | 5,298 |
| Ex. G-4 | | | 300 | 67.0 | 82.3 | 32.3 | 56.7 | 0.57 | 5,654 |
| Comp-Ex. H | WP | sago palm pellet | unheated | 100.0 | 100.0 | 16.3 | 68.2 | 0.24 | 4,403 |
| Ex. H-1 | PBT | | 230 | 76.6 | 86.8 | 27.5 | 60.5 | 0.45 | 4,989 |
| Ex. H-2 | | | 250 | 71.1 | 83.2 | 30.8 | 57.1 | 0.54 | 5,152 |
| Ex. H-3 | | | 270 | 63.3 | 78.1 | 35.8 | 51.1 | 0.70 | 5,436 |
| Ex. H-4 | | | 300 | 48.0 | 68.9 | 48.5 | 36.9 | 1.31 | 6,317 |
| Comp-Ex. I | WP | EFB | unheated | 100.0 | 100.0 | 16.5 | 67.6 | 0.24 | 4,463 |
| Ex. I-1 | PBT | | 230 | 81.3 | 90.1 | 22.6 | 65.2 | 0.35 | 4,946 |
| Ex. I-2 | | | 250 | 71.4 | 83.6 | 27.0 | 60.2 | 0.45 | 5,228 |
| Ex. I-3 | | | 270 | 52.0 | 73.4 | 40.3 | 45.3 | 0.89 | 6,303 |
| Ex. I-4 | | | 300 | 40.3 | 58.1 | 51.0 | 32.1 | 1.59 | 6,430 |
| Comp-Ex. J | WP | meranti | unheated | 100.0 | 100.0 | 13.6 | 74.8 | 0.18 | 4,793 |
| Ex. J-1 | PBT | | 250 | 87.7 | 95.4 | 20.2 | 72.9 | 0.28 | 5,213 |
| Ex. J-2 | | | 270 | 78.8 | 89.6 | 24.7 | 68.7 | 0.36 | 5,451 |
| Comp-Ex. K | WP | rubber tree | unheated | 100.0 | 100.0 | 12.9 | 74.1 | 0.17 | 4,461 |
| Ex. K-1 | PBT | | 270 | 87.6 | 94.7 | 17.7 | 71.2 | 0.25 | 4,822 |

| | | O wt % - dry | H wt % - dry | C wt % - dry | O/C | H/C | HGI | HGI ratio |
|---|---|---|---|---|---|---|---|---|
| Comp-Ex. B | WP | 42.1 | 5.7 | 51.9 | 0.61 | 1.32 | 23 | 1.0 |
| Ex. B-1 | PBT | 41.0 | 5.8 | 52.8 | 0.58 | 1.32 | 40 | 1.7 |
| Ex. B-2 | | 39.1 | 5.8 | 54.8 | 0.54 | 1.27 | 40 | 1.7 |
| Ex. B-3 | | 37.8 | 5.7 | 56.1 | 0.51 | 1.22 | 43 | 1.9 |
| Ex. B-4 | | 24.6 | 5.0 | 68.7 | 0.27 | 0.87 | 48 | 2.1 |
| Comp-Ex. C | WP | 40.2 | 5.1 | 47.5 | 0.63 | 1.29 | 24 | 1.0 |
| Ex. C-1 | PBT | 36.5 | 5.1 | 51.2 | 0.53 | 1.20 | 22 | 0.9 |
| Ex. C-2 | | 33.9 | 5.0 | 53.4 | 0.48 | 1.12 | 25 | 1.0 |
| Ex. C-3 | | 31.2 | 4.9 | 55.8 | 0.42 | 1.05 | 30 | 1.3 |
| Ex. C-4 | | 25.2 | 4.6 | 62.1 | 0.30 | 0.89 | 47 | 2.0 |
| Comp-Ex. D | WP | 40.4 | 5.0 | 47.8 | 0.63 | 1.26 | 31 | 1.0 |
| Ex. D-1 | PBT | 36.8 | 5.1 | 51.5 | 0.54 | 1.19 | 26 | 0.8 |
| Ex. D-2 | | 34.4 | 4.9 | 54.2 | 0.48 | 1.08 | 30 | 1.0 |
| Ex. D-3 | | 31.6 | 4.8 | 56.6 | 0.42 | 1.02 | 30 | 1.0 |
| Ex. D-4 | | 23.0 | 4.4 | 64.3 | 0.27 | 0.82 | 50 | 1.6 |
| Comp-Ex. E | WP | 44.1 | 5.6 | 49.8 | 0.66 | 1.35 | — | — |
| Ex. E-1 | PBT | 42.9 | 5.5 | 51.0 | 0.63 | 1.29 | — | — |
| Ex. E-2 | | 41.0 | 5.4 | 53.0 | 0.58 | 1.22 | — | — |
| Ex. E-3 | | 38.2 | 5.3 | 55.8 | 0.51 | 1.14 | — | — |

TABLE 5-continued

| | | | | | | | | |
|---|---|---|---|---|---|---|---|---|
| Comp-Ex. F | WP | 39.4 | 5.3 | 51.5 | 0.57 | 1.23 | — | — |
| Ex. F-1 | PBT | 35.4 | 5.2 | 55.3 | 0.48 | 1.13 | — | — |
| Ex. F-2 | | 33.6 | 5.0 | 57.1 | 0.44 | 1.05 | — | — |
| Ex. F-3 | | 31.7 | 4.9 | 59.1 | 0.40 | 0.99 | — | — |
| Ex. F-4 | | 29.5 | 4.7 | 61.3 | 0.36 | 0.92 | — | — |
| Comp-Ex. G | WP | 41.8 | 5.2 | 48.5 | 0.65 | 1.29 | 17 | 1.0 |
| Ex. G-1 | PBT | 40.0 | 5.3 | 51.0 | 0.59 | 1.25 | — | — |
| Ex. G-2 | | 33.7 | 5.2 | 56.2 | 0.45 | 1.11 | 22 | 1.3 |
| Ex. G-3 | | 35.4 | 5.2 | 55.4 | 0.48 | 1.13 | — | — |
| Ex. G-4 | | 31.3 | 5.1 | 59.1 | 0.40 | 1.04 | — | — |
| Comp-Ex. H | WP | 43.4 | 5.2 | 47.0 | 0.69 | 1.33 | 20 | 1.0 |
| Ex. H-1 | PBT | 37.1 | 4.9 | 53.5 | 0.52 | 1.10 | 38 | 1.9 |
| Ex. H-2 | | 35.3 | 4.8 | 55.2 | 0.48 | 1.04 | 37 | 1.9 |
| Ex. H-3 | | 31.3 | 4.5 | 58.5 | 0.40 | 0.92 | 34 | 1.7 |
| Ex. H-4 | | 21.7 | 4.0 | 67.3 | 0.24 | 0.71 | 46 | 2.3 |
| Comp-Ex. I | WP | 41.7 | 5.1 | 47.3 | 0.66 | 1.29 | — | — |
| Ex. I-1 | PBT | 37.7 | 5.2 | 51.4 | 0.55 | 1.21 | — | — |
| Ex. I-2 | | 34.6 | 5.1 | 54.0 | 0.48 | 1.13 | — | — |
| Ex. I-3 | | 24.0 | 4.8 | 62.7 | 0.29 | 0.92 | — | — |
| Ex. I-4 | | 17.7 | 4.0 | 67.7 | 0.20 | 0.71 | — | — |
| Comp-Ex. J | WP | 42.1 | 5.2 | 51.4 | 0.61 | 1.21 | — | — |
| Ex. J-1 | PBT | 39.3 | 5.3 | 54.3 | 0.54 | 1.17 | — | — |
| Ex. J-2 | | 36.4 | 5.2 | 57.2 | 0.48 | 1.09 | — | — |
| Comp-Ex. K | WP | | | | | | | |
| Ex. K-1 | PBT | 39.7 | 5.2 | 50.6 | 0.59 | 1.23 | | |

In table, HHV means dry-basis higher heating value

TABLE 6

| | | | | before immersion in water | | | | | |
|---|---|---|---|---|---|---|---|---|---|
| | | Ball mill grindability point | initial dimension mm | Mechanical durability (DU) (before immersion in water) % | bulk density kg/L | bulk density ratio | BET specific surface area m2/g | average pore diameter nm | total pore volume cm3/g |
| Comp-Ex. B | WP | 19.4 | Φ8.1 | 96.9 | 0.70 | 1.00 | 0.290 | 28.9 | 0.00210 |
| Ex. B-1 | PBT | 50.2 | Φ8.0 | 97.7 | 0.67 | 0.96 | 0.374 | 24.9 | 0.00233 |
| Ex. B-2 | | | | | | | | | |
| Ex. B-3 | | 85.8 | Φ7.8 | 96.9 | 0.64 | 0.91 | 0.392 | 22.2 | 0.00218 |
| Ex. B-4 | | — | Φ6.9 | 90.8 | | | 0.558 | 19.5 | 0.00272 |
| Comp-Ex. C | WP | 5.0 | Φ8.6 | 83.5 | 0.47 | 1.00 | 0.215 | 23.3 | 0.00125 |
| Ex. C-1 | PBT | 20.7 | Φ8.3 | 83.0 | 0.44 | 0.93 | 0.261 | 14.8 | 0.000969 |
| Ex. C-2 | | 29.1 | Φ8.2 | 78.9 | 0.42 | 0.89 | 0.301 | 18.2 | 0.00137 |
| Ex. C-3 | | 63.8 | Φ7.9 | 76.4 | 0.40 | 0.85 | 0.386 | 20.6 | 0.00199 |
| Ex. C-4 | | — | Φ7.8 | 65.0 | | | 0.628 | 30.9 | 0.00485 |
| Comp-Ex. D | WP | 6.9 | Φ8.6 | 89.1 | 0.62 | 1.00 | 0.268 | 24.5 | 0.00164 |
| Ex. D-1 | PBT | 32.5 | Φ8.0 | 87.5 | 0.59 | 0.95 | 0.320 | 22.6 | 0.00181 |
| Ex. D-2 | | 60.3 | Φ7.8 | 84.7 | 0.56 | 0.90 | 0.357 | 24.0 | 0.00214 |
| Ex. D-3 | | 74.8 | Φ7.5 | 83.1 | 0.53 | 0.86 | 0.402 | 21.3 | 0.00214 |
| Ex. D-4 | | — | Φ7.2 | 70.0 | | | 0.672 | 21.0 | 0.00352 |
| Comp-Ex. E | WP | — | Φ20.1 × H14.5 | — | | | 0.550 | 21.1 | 0.00290 |
| Ex. E-1 | PBT | — | Φ20.2 × H17.1 | — | | | 0.567 | 16.5 | 0.00234 |
| Ex. E-2 | | — | Φ20.2 × H16.2 | — | | | 0.632 | 20.5 | 0.00324 |
| Ex. E-3 | | — | Φ20.0 × H15.0 | — | | | 0.709 | 19.6 | 0.00347 |
| Comp-Ex. F | WP | — | Φ20.1 × H13.0 | — | | | 0.431 | 30.3 | 0.00327 |
| Ex. F-1 | PBT | — | Φ19.9 × H14.9 | — | | | 0.442 | 28.1 | 0.00311 |
| Ex. F-2 | | — | Φ20.0 × H14.5 | — | | | 0.442 | 31.6 | 0.00349 |
| Ex. F-3 | | — | Φ20.0 × H14.0 | — | | | 0.414 | 18.2 | 0.00189 |
| Ex. F-4 | | — | Φ20.0 × H14.0 | — | | | 0.462 | 19.9 | 0.00230 |
| Comp-Ex. G | WP | — | Φ8.0 | 90.5 | | | 0.188 | 17.2 | 0.000809 |
| Ex. G-1 | PBT | — | Φ8.0 | — | | | 0.228 | 12.3 | 0.00070 |
| Ex. G-2 | | — | Φ7.6 | — | | | 0.261 | 12.0 | 0.00078 |
| Ex. G-3 | | — | Φ7.5 | — | | | 0.248 | 11.4 | 0.00071 |
| Ex. G-4 | | — | Φ7.2 | — | | | 0.284 | 13.5 | 0.00096 |

TABLE 6-continued

| | | | | | | | | | |
|---|---|---|---|---|---|---|---|---|---|
| Comp-Ex. H | WP | 9.8 | Φ8.1 | 99.1 | 0.68 | 1.00 | 0.175 | 30.1 | 0.00132 |
| Ex. H-1 | PBT | 96.5 | Φ7.3 | 92.9 | 0.62 | 0.91 | 0.201 | 26.3 | 0.00132 |
| Ex. H-2 | | 97.8 | Φ7.2 | 92.7 | 0.61 | 0.89 | 0.191 | 25.4 | 0.00122 |
| Ex. H-3 | | 99.1 | Φ7.3 | 92.2 | 0.57 | 0.83 | 0.205 | 17.7 | 0.00090 |
| Ex. H-4 | | 99.4 | Φ6.9 | 86.3 | 0.51 | 0.75 | 0.276 | 15.3 | 0.00105 |
| Comp-Ex. I | WP | 4.4 | Φ7.9 | 96.1 | 0.69 | 1.00 | 0.288 | 35.2 | 0.00253 |
| Ex. I-1 | PBT | 78.9 | Φ7.7 | 93.2 | 0.62 | 0.90 | 0.396 | 25.9 | 0.00256 |
| Ex. I-2 | | 86.6 | Φ7.4 | 92.7 | 0.58 | 0.84 | 0.374 | 24.0 | 0.00224 |
| Ex. I-3 | | 98.9 | Φ7.2 | 75.5 | 0.51 | 0.74 | 0.438 | 20.9 | 0.00229 |
| Ex. I-4 | | — | Φ6.5 | 67.7 | 0.51 | 0.74 | 0.521 | 17.6 | 0.00230 |
| Comp-Ex. J | WP | 17.5 | Φ7.8 | 98.3 | 0.63 | 1.00 | | | |
| Ex. J-1 | PBT | 84.5 | Φ7.6 | 96.6 | 0.60 | 0.95 | | | |
| Ex. J-2 | | 97.3 | Φ7.4 | 94.6 | 0.56 | 0.89 | | | |

| | | after immersion in water | | | | | |
|---|---|---|---|---|---|---|---|
| | | COD mg/L | immersion time h | size mm | pH | moisture content wt % | Mechanical durability (DU) % |
| Comp-Ex. B | WP | 1,100 | — | — | — | — | — |
| Ex. B-1 | PBT | 710 | 168 | Φ9.2 | 4.65 | 35.6 | 95.8 |
| Ex. B-2 | | | | | | | |
| Ex. B-3 | | 560 | 168 | Φ8.0 | 4.60 | 22.1 | 96.5 |
| Ex. B-4 | | 42 | 168 | Φ7.0 | 7.68 | 31.1 | 91.9 |
| Comp-Ex. C | WP | 2,700 | — | — | — | — | — |
| Ex. C-1 | PBT | 1,900 | 168 | Φ8.9 | 5.57 | 40.7 | 81.8 |
| Ex. C-2 | | 1,200 | 168 | Φ8.7 | 5.96 | 39.5 | 79.5 |
| Ex. C-3 | | 630 | 168 | Φ8.4 | 6.87 | 36.5 | 80.7 |
| Ex. C-4 | | 210 | 168 | Φ7.8 | 8.29 | 37.1 | 66.3 |
| Comp-Ex. D | WP | 3,000 | — | — | — | — | — |
| Ex. D-1 | PBT | 1,900 | 168 | Φ8.7 | 5.94 | 33.2 | 86.4 |
| Ex. D-2 | | 980 | 168 | Φ8.0 | 6.01 | 30.7 | 86.8 |
| Ex. D-3 | | 480 | 168 | Φ8.0 | 6.72 | 25.7 | 87.6 |
| Ex. D-4 | | 150 | 168 | Φ7.3 | 8.30 | 27.1 | 75.4 |
| Comp-Ex. E | WP | 1,000 | 96 | disintegration | 5.51 | — | — |
| Ex. E-1 | PBT | 810 | 168 | Φ20.7 × H24.0 | 6.48 | 53.0 | — |
| Ex. E-2 | | 540 | 168 | Φ20.5 × H18.0 | 7.37 | 33.0 | — |
| Ex. E-3 | | 300 | 168 | Φ20.2 × H16.8 | 7.92 | 25.4 | — |
| Comp-Ex. F | WP | 10,000 | 96 | disintegration | 4.88 | — | — |
| Ex. F-1 | PBT | 1,600 | 168 | Φ20.7 × H17.1 | 6.59 | 38.3 | — |
| Ex. F-2 | | 890 | 240 | Φ20.2 × H15.0 | 7.32 | 34.7 | — |
| Ex. F-3 | | 480 | 264 | Φ20.2 × H18.5 | 7.89 | 32.6 | — |
| Ex. F-4 | | 270 | 168 | Φ20.1 × H14.2 | 7.50 | 27.3 | — |
| Comp-Ex. G | WP | 4,000 | — | — | — | — | — |
| Ex. G-1 | PBT | 1,800 | 168 | Φ8.7 | 6.54 | 32.6 | — |
| Ex. G-2 | | 1,100 | 144 | Φ8.1 | 6.55 | 31.1 | — |
| Ex. G-3 | | 1,100 | 168 | Φ8.1 | 7.01 | 29.2 | — |
| Ex. G-4 | | 510 | 168 | Φ7.5 | 7.05 | 29.5 | — |
| Comp-Ex. H | WP | 2,400 | 24 | disintegration | 4.01 | — | — |
| Ex. H-1 | PBT | 1,300 | 168 | Φ7.8 | 4.52 | 23.0 | 95.0 |
| Ex. H-2 | | 590 | 168 | Φ7.7 | 5.23 | 24.0 | 95.1 |
| Ex. H-3 | | 310 | 168 | Φ7.2 | 6.78 | 25.7 | 93.9 |
| Ex. H-4 | | 130 | 168 | Φ7.0 | 7.91 | 27.5 | 86.4 |
| Comp-Ex. I | WP | 2,400 | — | disintegration | — | — | — |
| Ex. I-1 | PBT | 2,300 | 168 | Φ7.9 | 6.91 | 28.5 | 93.5 |
| Ex. I-2 | | 1,500 | 168 | Φ7.7 | 7.15 | 27.7 | 93.4 |
| Ex. I-3 | | 740 | 168 | Φ7.1 | 8.04 | 29.8 | 82.9 |
| Ex. I-4 | | 200 | 168 | Φ6.6 | 9.10 | 32.7 | 78.9 |
| Comp-Ex. J | WP | 340 | — | disintegration | — | — | — |
| Ex. J-1 | PBT | 260 | 168 | Φ8.0 | 5.22 | 20.9 | |
| Ex. J-2 | | 170 | 168 | Φ7.8 | 5.37 | 22.1 | |

<Water Absorption Distribution>

Figure 24:
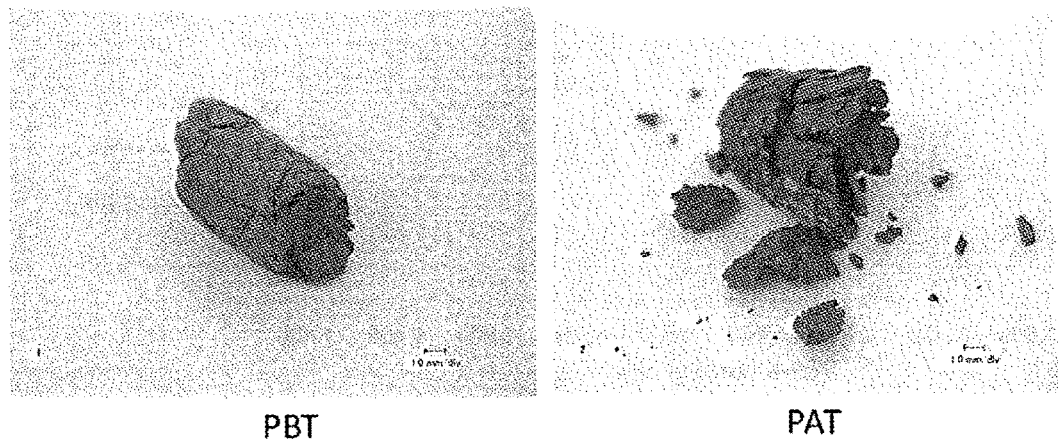
FIG. 24 is a photograph showing the shape of a pellet after immersion in physiological saline solution in Example B.
Figure 25:
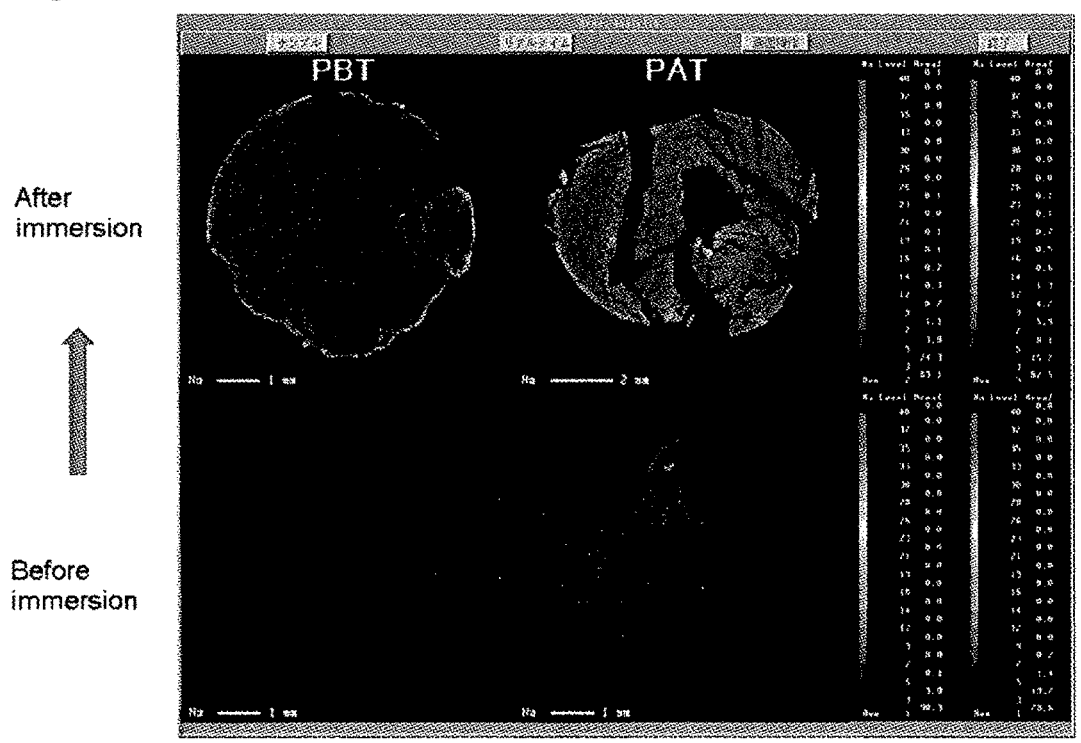
FIG. 25 is a diagram showing the distribution of sodium before and after immersion in physiological saline in Example B.

In order to compare the water resistance of PAT and PBT, sodium distribution of the biomass solid fuels after water absorption was examined using saline solution. As a sample of PAT, a solid fuel obtained by heating a raw material of European red pine at 250° C. and molding into pellets having diameter of 6 mm was used. As a sample of PBT, a solid fuel (solid fuel B) obtained by molding a raw material of European red pine into pellets having diameter of 6 mm and heating it at 250° C. The PBT and PAT was immersed in 0.9 wt % saline solution for 5 days. As a result, as FIG. 24 shows the appearance of pellets, the PBT maintained its pellet shape (FIG. 24, left), whereas the PAT disintegrated largely (FIG. 24, right). Further, for PAT and PBT each, samples before and after immersion in 0.9 wt % saline solution for 5 days were analyzed at their cross section by EPMA (Electron Probe MicroAnalyser) analysis, to compare Na distribution. In the PBT, Na distribution remains at the surface of the pellet and does not penetrate into the inside, whereas, in the PAT, Na is widely distributed into the inside (see FIG. 25). This means that penetration of saline solution is less in the PBT than in the PAT. From this result, it is presumed that in PBT, the thermal decomposition products of extracted components make a solid cross-linking in the gap between adjacent pulverized biomass particles and become hydrophobic to prevent the penetration of water, whereas, in PAT, since water can penetrate into the gap between pulverized biomass particles, water permeates into the inside of pellets and expands the gap between pulverized biomass particles, leading to the disintegrate.

[Expansion Ratio Before and after Immersion in Water]

The pellet length of the solid fuels of Examples A-1 and A-3 before and after immersion in water was measured. For the pellet length, ten pellets before the immersion was chosen and their length was measure by an electronic caliper (manufactured by Mitutoyo: CD-15CX, repeating precision is 0.01 mm and the second decimal place was rounded.) and the length of the same pellets after 72 hours immersion in water were measured again by electronic caliper. In case that the pellet end was diagonal before and/or after immersion, the length up to the most distal end portion was measured. Table 7 shows the measurement results. As shown in Table 7, the pellet length of Example A-1 increased by 4.6% in average, and Example A-3 increased by 0.2% in average.

TABLE 7

| L1 (mm) before immersion | | L2 (mm) 72 hous after immersion | | length expansion ratio (average) | |
|---|---|---|---|---|---|
| Example A-1 | Example A-3 | Example A-1 | Example A-3 | Example A-1 | Example A-3 |
| 17.4 | 18.9 | 20.1 | 15.9 | {(L2 − L1)/ L1} × 100% | |
| 17.9 | 18.7 | 17.1 | 18.1 | | |
| 19.8 | 17.9 | 20.8 | 13.5 | | |
| 16.5 | 17.5 | 18.0 | 17.5 | | |
| 19.7 | 15.0 | 19.5 | 17.7 | | |
| 18.0 | 13.8 | 18.6 | 14.7 | | |
| 18.1 | 16.2 | 19.6 | 18.9 | | |
| 20.2 | 17.8 | 19.7 | 17.6 | | |
| 17.5 | 17.4 | 18.2 | 19.0 | | |
| 18.2 | 14.9 | 20.1 | 15.6 | | |
| average 18.33 | average 16.81 | average 19.17 | average 16.85 | 4.6 | 0.2 |

Note:
In table 7, values on the same line do not correspond to the same sample.

In addition, the pellet diameter of the solid fuels of Examples A-1 to A-6 before and after immersion in water was measured by the same electronic caliper and the same measurement method as for Table 7. Table 8 shows the measurement results. The measured value of the pellet diameter is an average values of ten samples randomly selected respectively from Examples A-1 to A-6.

TABLE 8

| | before immersion in water | after immersion in water | | Diameter |
|---|---|---|---|---|
| | φ1 initial dimension (mm) | time (h) | φ2 dimension (mm) | expansion ratio {(φ2 − φ1)/φ1} × 100% |
| Comparative Example A | Φ8.0 | 24 | — | — |
| Example A-1 | Φ7.8 | 168 | Φ8.4 | 7.7 |
| Example A-2 | Φ7.7 | 168 | Φ8.1 | 5.2 |
| Example A-3 | Φ7.5 | 168 | Φ7.8 | 4.0 |
| Example A-4 | Φ7.5 | 168 | Φ7.7 | 2.7 |
| Example A-5 | Φ7.3 | 168 | Φ7.5 | 2.7 |
| Example A-6 | Φ7.2 | 144 | Φ7.3 | 1.4 |

Table 7 and Table 8 indicate that higher temperature in the heating step provides lower expansion ratio. Expansion is assumed to be suppressed by the formation of solid-linking due to heating. While the diameter expansion ratio of Table 8 is larger than the length expansion ratio of Table 7, this is considered because the immersion time is longer in Table 7, and also because Example A is in a pellet form which has been compacted mainly in the radial direction and therefore the expansion in the radial direction becomes large. It is noted that in Table 8, the diameter expansion ratio remains 10% or less even in Example A-1 which has the largest expansion ratio. In example A, the diameter and length expansion ratios are preferably 10% or less, and more preferably 7% or less. The volume expansion ratio is preferably 133% or less, and more preferably 123% or less.

While Table 7 and Table 8 show the expansion ratios of Example A, the expansion ratios of Examples B to J will be calculated based on Table 6. The expansion ratio was calculated by using the following equation (2) as used for Example A.

$$\text{Expansion ratio} = \{(\text{value after immersion} - \text{value before immersion})/\text{value before immersion}\} \times 100 \quad (2)$$

Example B is in a pellet form, and thus the diameter expansion ratio was calculated based on equation (2) using the pellet diameter before immersion (initial dimensions in Table 6) and the pellet diameter after immersion (dimension after immersion in Table 6), and the result is 15% or less (note that equation (2) is used for the calculation of diameter expansion ratios for Example B thereafter). Since the length expansion ratio<diameter expansion ratio can be estimated for the pellet form as in Example A, the length expansion ratio in Example B can be assumed up to 15% or less. Then, the volume expansion ratio is calculated as 152% or less (the volume after immersion relative to the volume 100% before immersion; and the same applies to the following Examples C and thereafter). In Example B, the diameter expansion ratio is preferably 20% or less, and more preferably 10% or less. The volume expansion ratio is preferably 173% or less, and more preferably 133% or less.

Example C is also in a pellet form, the diameter expansion ratio before and after the immersion is 7.2% or less, and the length expansion ratio is assumed 7.2% at largest; and thus the volume expansion ratio is 123% or less (the volume expansion ratios of pellets in the following Examples will be calculated in the same manner). In Example C, the diameter expansion ratio is preferably 13% or less, and more preferably 7% or less. The volume expansion ratio is preferably 144% or less, and more preferably 123% or less.

In Example D (in a pellet form), the diameter expansion ratio before and after the immersion is 8.8%, and the volume expansion ratio based thereon is 129% or less. In Example D, the diameter expansion ratio is preferably 10% or less, and more preferably 8% or less. The volume expansion ratio is preferably 133% or less, and more preferably 126% or less.

Example E is in a tablet shape, the diameter ($\varphi$) expansion ratio is 2.5% or less, the height (H) expansion ratio is 40% or less, and the volume expansion ratio is 147% or less. The diameter expansion ratio is preferably 5% or less, and more preferably 2.3% or less. The height expansion ratio is preferably 50% or less, more preferably 20% or less. The volume expansion ratio is preferably 165% or less, and more preferably 126% or less.

In Example F (in a tablet shape), the diameter expansion ratio is 4.0% or less, the height expansion ratio is 15% or less, and the volume expansion ratio is 124% or less. Herein, the height of Example F-3 after immersion is believed to be measurement error or variation due to individual differences. The diameter expansion ratio is preferably 5% or less, more preferably 3% or less. The height expansion ratio is preferably 40% or less, and more preferably 10% or less. The volume expansion ratio is preferably 154% or less, and more preferably to 117% or less.

In Example G (in a pellet form), the diameter expansion ratio before and after the immersion is 8.8% or less, and the volume expansion ratio based thereon is 129% or less. The diameter expansion ratio is preferably 10% or less, and more preferably 8% or less. The volume expansion ratio is preferably 133% or less, and more preferably 126% or less.

In Example H (in a pellet form), the diameter expansion ratio before and after the immersion is 6.9% or less, and the volume expansion ratio based thereon is 122% or less. The diameter expansion ratio is preferably 10% or less, and more preferably 7% or less. The volume expansion ratio is preferably 133% or less, and more preferably 123% or less.

In Example I (in a pellet form), the diameter expansion ratio before and after the immersion is 4.1% or less, and the volume expansion ratio based thereon is 113% or less. The diameter expansion ratio is preferably 10% or less, and more preferably 5% or less. The volume expansion ratio is preferably 133% or less, and more preferably 116% or less.

In Example J (in a pellet form), the diameter expansion ratio before and after the immersion is 5.4% or less, and the volume expansion ratio based thereon is 117% or less. The diameter expansion ratio is preferably 20% or less, and more preferably 10% or less. The volume expansion ratio is preferably 173% or less, and more preferably 133% or less.

As described above, in the solid fuels (PBT) of the present invention using biomass as a raw material, the length (including diameter and height) expansion ratio before and after the immersion is preferably 40% or less for each case, and the volume expansion ratio is preferably about 275% or less. It is further more preferred that the diameter and length expansion ratios are 30% or less and the volume expansion ratio is about 220% or less. It is yet further more preferred that the diameter and length expansion ratios are 20% or less and the volume expansion ratio is about 173% or less. It is yet further more preferred that the diameter and length expansion ratios are 10% or less and the volume expansion ratio is about 133% or less. If the expansion ratio after immersion in water is within a certain range as above, the biomass solid fuel of the present invention (PBT) does not disintegrate even by immersion, showing that it has water resistance.

The invention claimed is:

1. A molded-then-torrefied biomass solid fuel obtained by a method comprising a molding step of molding pulverized biomass into unheated biomass blocks and then a torrefying step of torrefying the unheated biomass blocks in a furnace, wherein the molded-then-torrefied biomass solid fuel has a fuel ratio (fixed carbon / volatile matter) of 0.2 to 0.8, dry-basis higher heating value of 4800 to 7000 (kcal/kg), a molar ratio of oxygen O to carbon C (O/C) of 0.1 to 0.7, and a molar ratio of hydrogen H to carbon C (H/C) of 0.8 to 1.3, and a chemical oxygen demand (COD) of 3000 ppm or less, and the molded-then-torrefied biomass solid fuel consists of substances derived from a raw material of the pulverized biomass, and wherein bonding or adhesion of the molded-then-torrefied biomass solid fuel is maintained after immersion in water.

2. The molded-then-torrefied biomass solid fuel according to claim 1, having BET specific surface area of 0.15 m$^2$/g to 0.8 m$^2$/g.

3. The molded-then-torrefied biomass solid fuel according to claim 1, wherein a torrefying temperature in the torrefying step is 150° C. to 400° C.

4. The molded-then-torrefied biomass solid fuel according to claim 1, wherein a torrefying temperature in the torrefying step is 200° C. to 350° C.

5. The molded-then-torrefied biomass solid fuel according to claim 1, which is wood-based and/or herbaceous-based and contains no binder.

6. The molded-then-torrefied biomass solid fuel according to claim 1, wherein B/A=0.7 to 1 is satisfied, wherein A is a bulk density of the unheated biomass blocks and B is a bulk density of the molded-then-torrefied biomass solid fuel.

7. The molded-then-torrefied biomass solid fuel according to claim 1, having a Hardgrove grindability index (HGI) of 15 or more and 60 or less.

8. The molded-then-torrefied biomass solid fuel according to claim 1, wherein the molded-then-torrefied biomass solid fuel develops formation of solid cross linkage whereby bonding or adhesion of the molded-then-torrefied biomass solid fuel is maintained after immersion in water.

9. The molded-then-torrefied biomass solid fuel according to claim 1, wherein the raw material of the pulverized biomass comprises at least one selected from the group consisting of douglas fir, hemlock, cedar, cypress, European red pine, almond old tree, almond shell, acacia xylem part, acacia bark, walnut shell, sago palm, EFB (empty fruit bunch that is a residue of palm oil processing), meranti and rubber tree.

10. The molded-then-torrefied biomass solid fuel according to claim 1, having COD (chemical oxygen demand) of 42 ppm or more.

11. The molded-then-torrefied biomass solid fuel according to claim 1, having an equilibrium moisture content after immersion in water of 15 to 65 wt%.

12. The molded-then-torrefied biomass solid fuel according to claim 11, wherein B/A=0.7 to 1 is satisfied, wherein A is a bulk density of the unheated biomass blocks and B is a bulk density of the molded-then-torrefied biomass solid fuel.

13. The molded-then-torrefied biomass solid fuel according to claim 12, having a Hardgrove grindability index (HGI) of 15 or more and 60 or less.

14. A method of manufacturing a molded-then-torrefied biomass solid fuel, comprising:
   a molding step of molding pulverized biomass into unheated biomass blocks, and
   a torrefying step of torrefying the unheated biomass blocks in a furnace to obtain a torrefied solid product, the torrefied solid product being used as the biomass solid fuel; wherein
   torrefying temperature in the torrefying step is 150° C. to 400° C., and
   the molded-then-torrefied biomass solid fuel has fuel ratio (fixed carbon / volatile matter) of 0.2 to 0.8, dry-basis higher heating value of 4800 to 7000 (kcal/kg), a molar ratio of oxygen O to carbon C (O/C) of 0.1 to 0.7, and a molar ratio of hydrogen H to carbon C (H/C) of 0.8 to 1.3, and
   bonding or adhesion of the molded-then-torrefied biomass solid fuel is maintained after immersion in water, and a chemical oxygen demand (COD) of the molded-then-torrefied biomass solid fuel is 3000 ppm or less, and
   the molded-then-torrefied biomass solid fuel consists of substances derived from a raw material of the pulverized biomass.

15. The method of manufacturing a molded-then-torrefied biomass solid fuel according to claim 14, wherein H2/H1=1.1 to 2.5 is satisfied, wherein H1 is a HGI (Hardgrove grindability index) of the unheated biomass blocks and H2 is a HGI of the torrefied solid product.

16. The method of manufacturing a molded-then-torrefied biomass solid fuel according to claim 14, wherein a torrefying temperature in the torrefying step is 200° C. to 350° C.

17. The method of manufacturing a molded-then-torrefied biomass solid fuel according to claim 14, wherein in the molding step, the biomass is wood-based and/or herbaceous-based, and in the molded unheated biomass blocks contain no binder.

18. The method of manufacturing a molded-then-torrefied biomass solid fuel according to claim 14, wherein the raw material of the pulverized biomass comprises at least one selected from the group consisting of a mixture of douglas fir, hemlock, cedar, and cypress; European red pine; almond old tree; a mixture of almond shell and almond old tree; acacia xylem part; acacia bark, a mixture of almond shell and walnut shell; sago palm; EFB (empty fruit bunch), meranti; and rubber tree.

19. The method of manufacturing a molded-then-torrefied biomass solid fuel according to claim 14, wherein B/A=0.7 to 1 is satisfied, wherein A is a bulk density of the unheated biomass blocks and B is a bulk density of the torrefied solid product.

20. The method of manufacturing a molded-then-torrefied biomass solid fuel according to claim 19, wherein the molded-then-torrefied biomass solid fuel has an equilibrium moisture content after immersion in water of 15 to 65 wt%.

21. A molded-then-torrefied biomass solid fuel obtained by a method comprising a molding step of molding pulverized biomass into unheated biomass blocks and then a torrefying step of torrefying the unheated biomass blocks in a furnace, wherein the biomass solid fuel has a fuel ratio (fixed carbon / volatile matter) of 0.2 to 0.8, dry-basis higher heating value of 4800 to 7000 (kcal/kg), a molar ratio of oxygen O to carbon C (O/C) of 0.1 to 0.7, and a molar ratio of hydrogen H to carbon C (H/C) of 0.8 to 1.3, wherein bonding or adhesion of the molded-then-torrefied biomass solid fuel is maintained after immersion in water, wherein at least one condition selected from the group consisting of the following conditions (a1) to (f1) is satisfied :
   condition (a1): a raw material of the pulverized biomass particles is a mixture of douglas fir, hemlock, cedar and cypress and the molded-then-torrefied biomass solid fuel has COD of 1000 ppm or less;
   condition (b1): a raw material of the pulverized biomass particles is European red pine and the molded-then-torrefied biomass solid fuel has COD of 900 ppm or less;
   condition (c1): a raw material of the pulverized biomass particles is almond old tree and the molded-then-torrefied biomass solid fuel has COD of 2100 ppm or less;
   condition (d1): a raw material of the pulverized biomass particles is a mixture of almond shell and almond old tree and the molded-then-torrefied biomass solid fuel has COD of 2500 ppm or less;
   condition (e1): a raw material of the pulverized biomass particles is acacia xylem part and the molded-then-torrefied biomass solid fuel has COD of 950 ppm or less;
   condition (f1): a raw material of the pulverized biomass particles is acacia bark and the molded-then-torrefied biomass solid fuel has COD of 2500 ppm or less;
   condition (g1): a raw material of the pulverized biomass particles is a mixture of almond shell and walnut shell and the molded-then-torrefied biomass solid fuel has COD of 2500 ppm or less;
   condition (h1): a raw material of the pulverized biomass particles is sago palm and the molded-then-torrefied biomass solid fuel has COD of 2000 ppm or less;
   condition (i1): a raw material of the pulverized biomass particles is EFB (empty fruit bunch) and the molded-then-torrefied biomass solid fuel has COD of 2350 ppm or less; and
   condition (j1): a raw material of the pulverized biomass particles is meranti and the molded-then-torrefied biomass solid fuel has COD of 330 ppm or less.

22. The molded-then-torrefied biomass solid fuel according to claim 21, wherein at least one condition selected from the group consisting of the following conditions (a2) to (f2) is further satisfied :
   condition (a2): the raw material of the pulverized biomass particles is a mixture of douglas fir, hemlock, cedar and cypress and the molded-then-torrefied biomass solid fuel has COD of 1000 ppm or less;
   condition (b2): the raw material of the pulverized biomass particles is European red pine and the molded-then-torrefied biomass solid fuel has COD of 710 ppm or less;
   condition (c2): the raw material of the pulverized biomass particles is almond old tree and the molded-then-torrefied biomass solid fuel has COD of 1900 ppm or less;
   condition (d2): the raw material of the pulverized biomass particles is a mixture of almond shell and almond old tree and the molded-then-torrefied biomass solid fuel has COD of 1900 ppm or less; p1 condition (e2): the raw material of the pulverized biomass particles is acacia xylem part and the molded-then-torrefied biomass solid fuel has COD of 810 ppm or less;
   condition (f2): the raw material of the pulverized biomass particles is acacia bark and the molded-then-torrefied biomass solid fuel has COD of 1600 ppm or less;
   condition (g2): the raw material of the pulverized biomass particles is a mixture of almond shell and walnut shell and the molded-then-torrefied biomass solid fuel has COD of 1800 ppm or less;

condition (h2): the raw material of the pulverized biomass particles is sago palm and the molded-then-torrefied biomass solid fuel has COD of 1300 ppm or less;

condition (i2): the raw material of the pulverized biomass particles is EFB (empty fruit bunch) and the molded-then-torrefied biomass solid fuel has COD of 2300 ppm or less; and condition (j2): the raw material of the pulverized biomass particles is meranti and the molded-then-torrefied biomass solid fuel has COD of 260 ppm or less.

23. A molded-then-torrefied biomass solid fuel obtained by a method comprising a molding step of molding pulverized biomass into unheated biomass blocks and then a torrefying step of torrefying the unheated biomass blocks in a furnace, wherein the biomass solid fuel has a fuel ratio (fixed carbon / volatile matter) of 0.2 to 0.8, dry-basis higher heating value of 4800 to 7000 (kcal/kg), a molar ratio of oxygen O to carbon C (O/C) of 0.1 to 0.7, and a molar ratio of hydrogen H to carbon C (H/C) of 0.8 to 1.3, wherein bonding or adhesion of the molded-then-torrefied biomass solid fuel is maintained after immersion in water, wherein at least one condition selected from the group consisting of the following conditions (b3) to (f3) is satisfied :

condition (b3): a raw material of the pulverized biomass particles is European red pine and the molded-then-torrefied biomass solid fuel has COD of 42 ppm or more;

condition (c3): a raw material of the pulverized biomass particles is almond old tree and the molded-then-torrefied biomass solid fuel has COD of 210 ppm or more;

condition (d3): a raw material of the pulverized biomass particles is a mixture of almond shell and almond old tree and the molded-then-torrefied biomass solid fuel has COD of 150 ppm or more;

condition (e3): a raw material of the pulverized biomass particles is acacia xylem part and the molded-then-torrefied biomass solid fuel has COD of 300 ppm or more;

condition (f3): a raw material of the pulverized biomass particles is acacia bark and the molded-then-torrefied biomass solid fuel has COD of 270 ppm or more;

condition (g3): a raw material of the pulverized biomass particles is a mixture of almond shell and walnut shell and the molded-then-torrefied biomass solid fuel has COD of 510 ppm or more;

condition (h3): a raw material of the pulverized biomass particles is sago palm and the molded-then-torrefied biomass solid fuel has COD of 130 ppm or more;

condition (i3): a raw material of the pulverized biomass particles is EFB (empty fruit bunch) and the molded-then-torrefied biomass solid fuel has COD of 200 ppm or more; and condition (j3): a raw material of the pulverized biomass particles is meranti and the molded-then-torrefied biomass solid fuel has COD of 170 ppm or more.

24. A method of manufacturing a molded-then-torrefied biomass solid fuel, comprising:

a molding step of molding pulverized biomass into unheated biomass blocks, and a torrefying step of torrefying the unheated biomass blocks in a furnace to obtain a torrefied solid product, the torrefied solid product being used as the biomass solid fuel; wherein torrefying temperature in the torrefying step is 150° C. to 400° C., and the molded-then-torrefied biomass solid fuel has fuel ratio (fixed carbon / volatile matter) of 0.2 to 0.8, dry-basis higher heating value of 4800 to 7000 (kcal/kg), a molar ratio of oxygen O to carbon C (O/C) of 0.1 to 0.7, and a molar ratio of hydrogen H to carbon C (H/C) of 0.8 to 1.3, and bonding or adhesion of the molded-then-torrefied biomass solid fuel is maintained after immersion in water, and at least one condition selected from the group consisting of the following conditions (a1) to (f1) is satisfied :

condition (a1): a raw material of the pulverized biomass particles is a mixture of douglas fir, hemlock, cedar and cypress and the molded-then-torrefied biomass solid fuel has COD of 1000 ppm or less;

condition (b1): a raw material of the pulverized biomass particles is European red pine and the molded-then-torrefied biomass solid fuel has COD of 900 ppm or less;

condition (c1): a raw material of the pulverized biomass particles is almond old tree and the molded-then-torrefied biomass solid fuel has COD of 2100 ppm or less;

condition (d1): a raw material of the pulverized biomass particles is a mixture of almond shell and almond old tree and the molded-then-torrefied biomass solid fuel has COD of 2500 ppm or less;

condition (e1): a raw material of the pulverized biomass particles is acacia xylem part and the molded-then-torrefied biomass solid fuel has COD of 950 ppm or less;

condition (f1): a raw material of the pulverized biomass particles is acacia bark and the molded-then-torrefied biomass solid fuel has COD of 2500 ppm or less;

condition (g1): a raw material of the pulverized biomass particles is a mixture of almond shell and walnut shell and the molded-then-torrefied biomass solid fuel has COD of 2500 ppm or less;

condition (h1): a raw material of the pulverized biomass particles is sago palm and the molded-then-torrefied biomass solid fuel has COD of 2000 ppm or less;

condition (i1): a raw material of the pulverized biomass particles is EFB (empty fruit bunch) and the molded-then-torrefied biomass solid fuel has COD of 2350 ppm or less; and condition (j1): a raw material of the pulverized biomass particles is meranti and the molded-then-torrefied biomass solid fuel has COD of 330 ppm or less.

25. The method of manufacturing a molded-then-torrefied biomass solid fuel according to claim 24, wherein at least one condition selected from the group consisting of the following conditions (a2) to (f2) is further satisfied :

condition (a2): the raw material of the pulverized biomass particles is a mixture of douglas fir, hemlock, cedar and cypress and the molded-then-torrefied biomass solid fuel has COD of 1000 ppm or less;

condition (b2): the raw material of the pulverized biomass particles is European red pine and the molded-then-torrefied biomass solid fuel has COD of 710 ppm or less;

condition (c2): the raw material of the pulverized biomass particles is almond old tree and the molded-then-torrefied biomass solid fuel has COD of 1900 ppm or less;

condition (d2): the raw material of the pulverized biomass particles is a mixture of almond shell and almond old tree and the molded-then-torrefied biomass solid fuel has COD of 1900 ppm or less;

condition (e2): the raw material of the pulverized biomass particles is acacia xylem part and the molded-then-torrefied biomass solid fuel has COD of 810 ppm or less;

condition (f2): the raw material of the pulverized biomass particles is acacia bark and the molded-then-torrefied biomass solid fuel has COD of 1600 ppm or less;

condition (g2): the raw material of the pulverized biomass particles is a mixture of almond shell and walnut shell and the molded-then-torrefied biomass solid fuel has COD of 1800 ppm or less;

condition (h2): the raw material of the pulverized biomass particles is sago palm and the molded-then-torrefied biomass solid fuel has COD of 1300 ppm or less;

condition (i2): the raw material of the pulverized biomass particles is EFB (empty fruit bunch) and the molded-then-torrefied biomass solid fuel has COD of 2300 ppm or less; and condition (j2): the raw material of the pulverized biomass particles is meranti and the molded-then-torrefied biomass solid fuel has COD of 260 ppm or less.

26. A method of manufacturing a molded-then-torrefied biomass solid fuel, comprising:

a molding step of molding pulverized biomass into unheated biomass blocks, and a torrefying step of torrefying the unheated biomass blocks in a furnace to obtain a torrefied solid product, the torrefied solid product being used as the biomass solid fuel; wherein torrefying temperature in the torrefying step is 150° C. to 400° C., and the molded-then-torrefied biomass solid fuel has fuel ratio (fixed carbon / volatile matter) of 0.2 to 0.8, dry-basis higher heating value of 4800 to 7000 (kcal/kg), a molar ratio of oxygen O to carbon C (O/C) of 0.1 to 0.7, and a molar ratio of hydrogen H to carbon C (H/C) of 0.8 to 1.3, and bonding or adhesion of the molded-then-torrefied biomass solid fuel is maintained after immersion in water, and a chemical oxygen demand (COD) of the molded-then-torrefied biomass solid fuel is 3000 ppm or less, and at least one condition selected from the group consisting of the following conditions (b3) to (f3) is satisfied:

condition (b3): a raw material of the pulverized biomass particles is European red pine and the molded-then-torrefied biomass solid fuel has COD of 42 ppm or more;

condition (c3): a raw material of the pulverized biomass particles is almond old tree and the molded-then-torrefied biomass solid fuel has COD of 210 ppm or more;

condition (d3): a raw material of the pulverized biomass particles is a mixture of almond shell and almond old tree and the molded-then-torrefied biomass solid fuel has COD of 150 ppm or more;

condition (e3): a raw material of the pulverized biomass particles is acacia xylem part and the molded-then-torrefied biomass solid fuel has COD of 300 ppm or more;

condition (f3): a raw material of the pulverized biomass particles is acacia bark and the molded-then-torrefied biomass solid fuel has COD of 270 ppm or more;

condition (g3): a raw material of the pulverized biomass particles is a mixture of almond shell and walnut shell and the molded-then-torrefied biomass solid fuel has COD of 510 ppm or more;

condition (h3): a raw material of the pulverized biomass particles is sago palm and the molded-then-torrefied biomass solid fuel has COD of 130 ppm or more;

condition (i3): a raw material of the pulverized biomass particles is EFB (empty fruit bunch) and the molded-then-torrefied biomass solid fuel has COD of 200 ppm or more; and condition (j3): a raw material of the pulverized biomass particles is meranti and the amolded-then-torrefied biomass solid fuel has COD of 170 ppm or more.

* * * * *

UNITED STATES PATENT AND TRADEMARK OFFICE
CERTIFICATE OF CORRECTION

PATENT NO. : 11,390,822 B2
APPLICATION NO. : 15/514776
DATED : July 19, 2022
INVENTOR(S) : Shigeya Hayashi et al.

It is certified that error appears in the above-identified patent and that said Letters Patent is hereby corrected as shown below:

In the Claims

At Column 36, Line 57, in Claim 22, after the (";"), the term "p1" should be deleted.

At Column 36, Line 57, in Claim 22, after the term "p1", the phrase beginning with "condition (e2):" should be started in a new line.

Signed and Sealed this
Thirteenth Day of December, 2022

Katherine Kelly Vidal
*Director of the United States Patent and Trademark Office*